(12) United States Patent
Ji et al.

(10) Patent No.: US 12,047,889 B2
(45) Date of Patent: Jul. 23, 2024

(54) HANDLING OF COLLISION WITH SSB FOR NTN

(71) Applicant: QUALCOMM Incorporated, San Diego, CA (US)

(72) Inventors: Lianghai Ji, San Diego, CA (US); Huilin Xu, Temecula, CA (US); Liangping Ma, San Diego, CA (US); Qiang Wu, San Diego, CA (US); Jun Ma, San Diego, CA (US); Mehmet Izzet Gurelli, San Diego, CA (US); Weimin Duan, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 17/649,514

(22) Filed: Jan. 31, 2022

(65) Prior Publication Data
US 2023/0247571 A1   Aug. 3, 2023

(51) Int. Cl.
*H04W 56/00* (2009.01)
*H04B 7/185* (2006.01)
*H04W 74/0833* (2024.01)
*H04W 84/06* (2009.01)

(52) U.S. Cl.
CPC ...... *H04W 56/001* (2013.01); *H04B 7/18589* (2013.01); *H04W 74/0841* (2013.01); *H04W 84/06* (2013.01)

(58) Field of Classification Search
CPC ........... H04W 56/001; H04W 74/0841; H04W 84/06; H04B 7/18589; H04B 7/088; H04B 7/0695
See application file for complete search history.

(56) References Cited

U.S. PATENT DOCUMENTS

| | | | | |
|---|---|---|---|---|
| 2020/0383118 A1* | 12/2020 | Park | ...................... | H04W 24/02 |
| 2021/0136825 A1* | 5/2021 | Ly | ..................... | H04W 74/0816 |
| 2021/0153144 A1* | 5/2021 | Radulescu | ............ | H04W 56/00 |
| 2021/0289455 A1* | 9/2021 | Sun | ...................... | H04W 56/001 |
| 2021/0336687 A1* | 10/2021 | Pezeshki | ................ | H04B 7/088 |
| 2022/0124671 A1* | 4/2022 | Taherzadeh Boroujeni | ................ H04W 68/005 |  |
| 2023/0354056 A1* | 11/2023 | Zhou | ...................... | H04W 24/10 |

FOREIGN PATENT DOCUMENTS

WO      2021122549 A1    6/2021
WO      WO-2021179314 A1 *  9/2021  ........... H04L 1/0013

OTHER PUBLICATIONS

International Search Report and Written Opinion—PCT/US2023/010511—ISA/EPO—Mar. 30, 2023.

* cited by examiner

*Primary Examiner* — Afshawn M Towfighi

(74) *Attorney, Agent, or Firm* — Procopio, Cory, Hargreaves & Savitch LLP

(57) ABSTRACT

In an aspect of the disclosure, a method, a computer-readable medium, and an apparatus at a UE in NTN are provided. An example method at a UE may include obtaining an indication of a subset of one or more SSB beams included in a set of SSB beams. The example method may further include outputting for transmission or obtaining a communication independent of using any resources associated with SSB transmission via the subset of one or more SSB beams.

27 Claims, 14 Drawing Sheets

HANDLING OF COLLISION WITH SSB FOR NTN

TECHNICAL FIELD

The present disclosure relates generally to communication systems, and more particularly, to wireless communication systems with a non-terrestrial network (NTN).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirement associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to obtain an indication of a subset of one or more synchronization signal block (SSB) beams included in a set of SSB beams. The memory and the at least one processor coupled to the memory may be further configured to output for transmission or obtain a communication independent of using any resources associated with SSB transmission via the subset of one or more SSB beams.

In another aspect of the disclosure, a method, a computer-readable medium, and an apparatus at a network device are provided. The apparatus may include a memory and at least one processor coupled to the memory. The memory and the at least one processor coupled to the memory may be configured to output for transmission an indication of a subset of one or more SSB beams included in a set of SSB beams. The memory and the at least one processor coupled to the memory may be further configured to output for transmission or obtain a communication with one or more UEs independent of using resources associated with SSB resources for SSB transmission via the subset of the one or more SSB beams.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
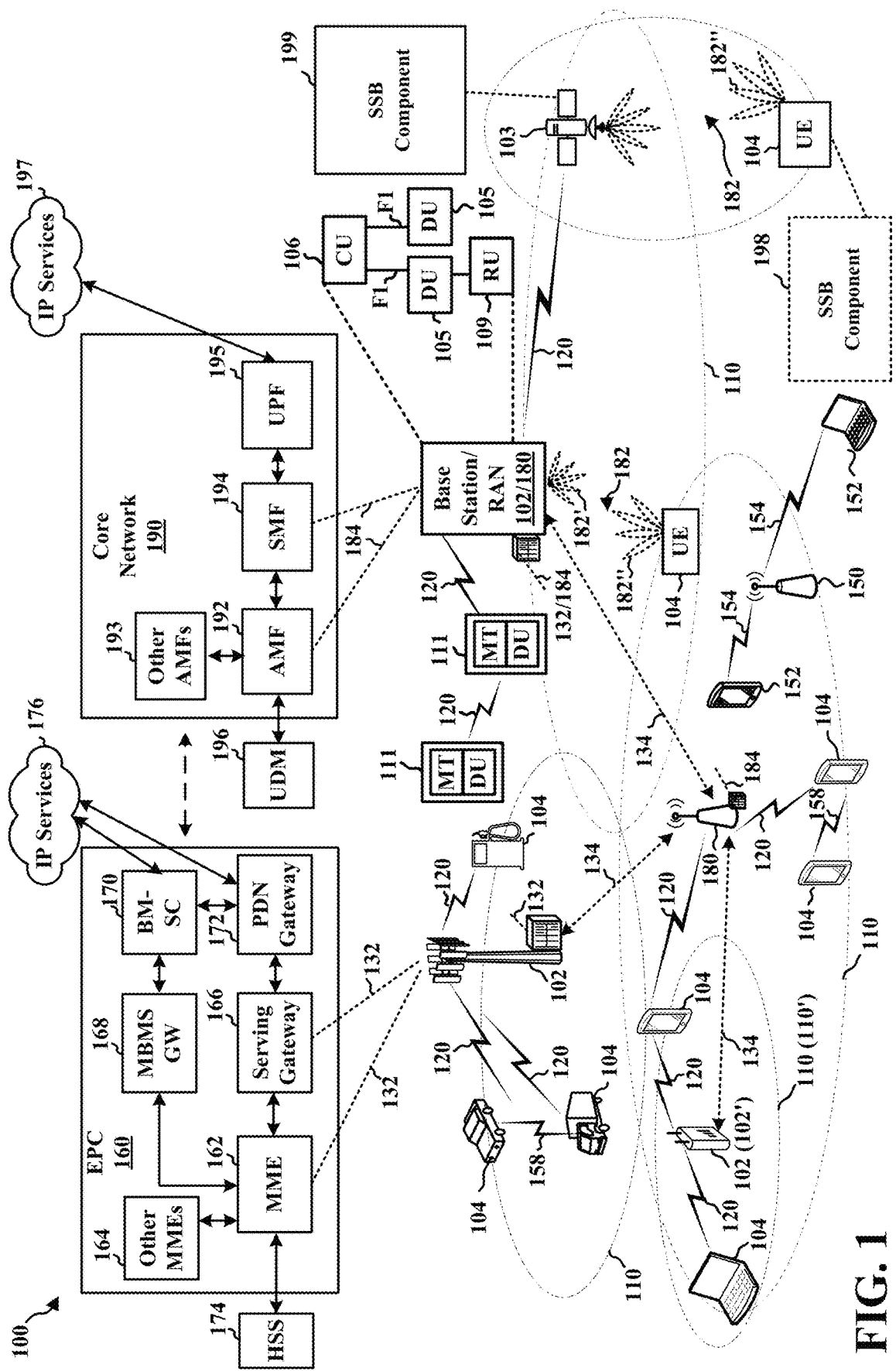
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between or among the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between or among the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between or among the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between or among the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

In some aspects, the base station 102 may communicate with the UE 104 via an NTN device 103, such as a satellite. In some aspects, the NTN device 103 may be a transparent satellite that performs one or more of amplification, filtering, and frequency conversion. In some aspects where the NTN device 103 is a transparent satellite, the NTN device 103 may receive signals from the base station 102 and relay, such as by performing amplify-and-forward relay, the signal to one or more UEs 104. The NTN device 103 may also receive signals from one or more UEs 104 and relay, such as by performing amplify-and forward relay, the signal to the base station 102. In some aspects, the NTN device 103 may also convert the carrier frequency between the input/received signal and the output/transmitted signal. The communication link between the NTN device 103 and the base station 102 may be referred to as a feeder link. In some aspects, the NTN device 103 may be a non-transparent satellite that may be capable of performing one or more aspects performed by the base station 102. In some aspects, the NTN device 103 may be a base station and may be connected to the core network 190.

Referring again to FIG. 1, in some aspects, the UE 104 may include an SSB component 198. In some aspects, the SSB component 198 may be configured to obtain an indication of a subset of one or more SSB beams included in a set of SSB beams. In some aspects, the SSB component 198 may be configured to autonomously determine a subset of one or more SSB beams included in a set of SSB beams for resource conflict avoidance. In some aspects, the SSB component 198 may be further configured to output for transmission or obtain a communication independent of using any resources associated with SSB transmission via the subset of one or more SSB beams.

In certain aspects, the NTN device 103, the base station 180, or another network node may include an SSB component 199. In some aspects, the SSB component 199 may be configured to output for transmission an indication of a subset of one or more SSB beams included in a set of SSB beams. In some aspects, the SSB component 199 may be configured to obtain an indication of a subset of one or more SSB beams included in a set of SSB beams for resource conflict avoidance. In some aspects, the SSB component 199 may be configured to obtain assistance information to determine a subset of one or more SSB beams included in a set of SSB beams. In some aspects, the SSB component 199 may be configured to output for transmission or obtain a communication with one or more UEs independent of using resources associated with SSB resources for SSB transmission via the subset of the one or more SSB beams.

Although the following description may be focused on 5G NR, the concepts described herein may be applicable to other similar areas, such as LTE, LTE-A, CDMA, GSM, and other wireless technologies.

Figure 2:
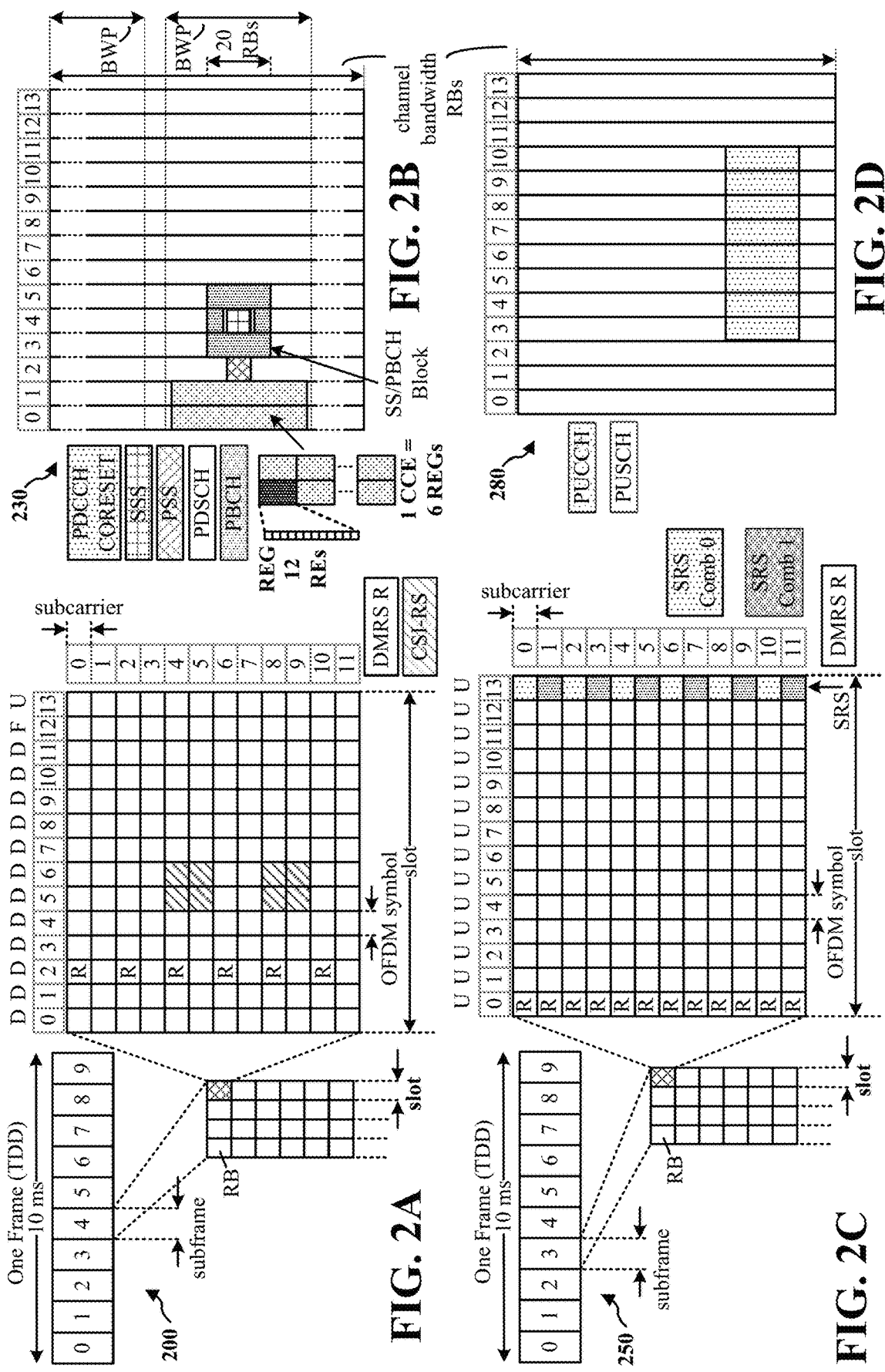
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) (indicated as R for one particular configuration, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DMRS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
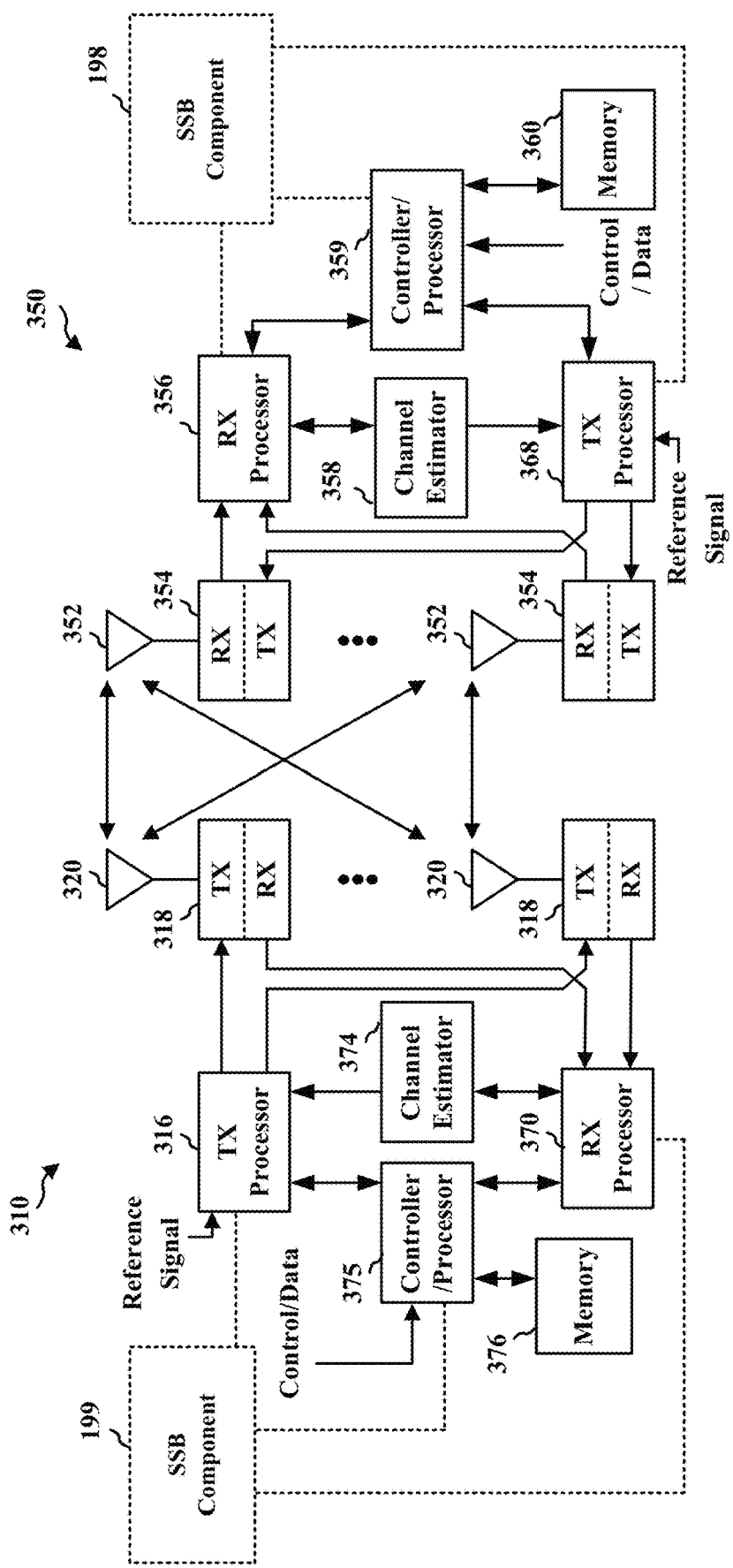
FIG. 3 is a diagram illustrating an example of a network device and user equipment (UE), in accordance with various aspects of the present disclosure.

FIG. 3 is a block diagram of a network device (e.g., a base station or an NTN device such as a satellite) 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the network device 310. These soft decisions may be based on channel estimates computed by the channel estimator 358. The soft decisions are then decoded and deinterleaved to recover the data and control signals that were originally transmitted by the network device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the network device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the network device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the network device 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with SSB component 198 of FIG. 1.

At least one of the TX processor 316, the RX processor 370, and the controller/processor 375 may be configured to perform aspects in connection with SSB component 199 of FIG. 1.

NTN network utilizing satellites may be integrated in a wireless communication system, such as a 5G communication system to facilitate the communication between or among a base station, or a RAN, and a UE. For example, in some aspects, a transparent satellite that performs amplification, spatial filtering, or frequency conversion may relay communication transmitted from a base station to UEs. In another example, a non-transparent satellite may serve as at least part of a 5G base station. NTN may provide service coverage to areas where terrestrial cellular service is not available. The network device that a UE may connect to over the air may be a satellite, balloon, drones, or the like.

An NTN wireless channel may be characterized with relatively strong line of sight (LoS) compared with a terrestrial network (TN). In an NTN, signals may be reflected to the sky instead of traveling in a direction over the ground surface, making the LoS potentially larger. In an NTN, a beam footprint or coverage area of different beams that radiate from the satellite may have clear boundary and may have a large enough coverage area that a UE may receive a signal from a single beam, e.g., unless the UE is in a boundary area of the beam. In either case, e.g., whether near a beam boundary or more distance from the beam boundary, the times at which the UE receives a signal from a satellite beam may be known, or predicted, e.g., based on the location of the UE within a coverage area of the beam.

Figure 4B:
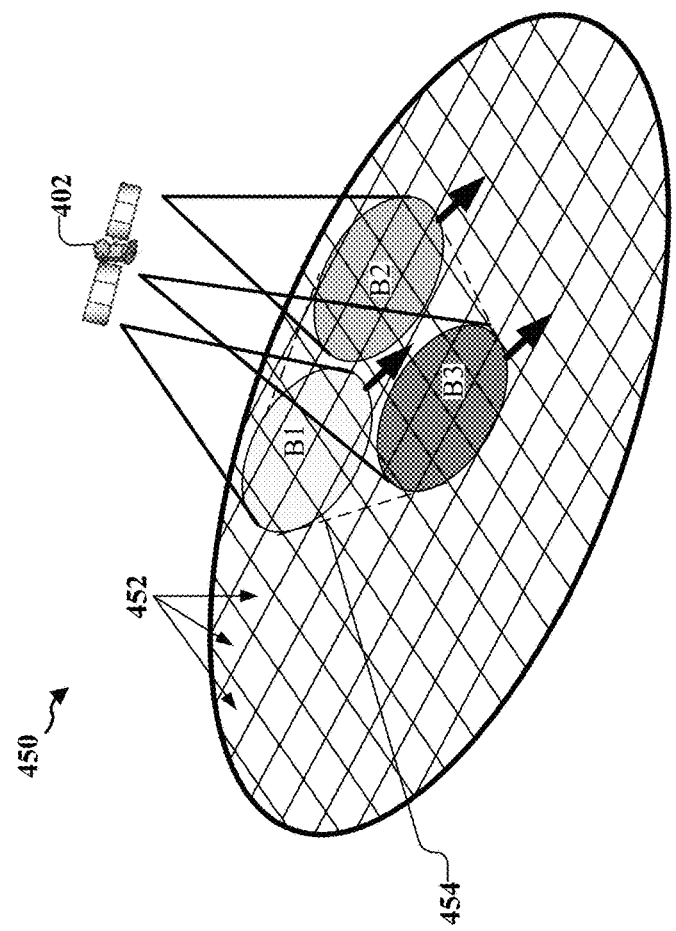
FIGS. 4A and 4B are diagrams illustrating an example NTN satellite using beam directions for communication with a UE, in accordance with various aspects of the present disclosure.
Figure 4A:
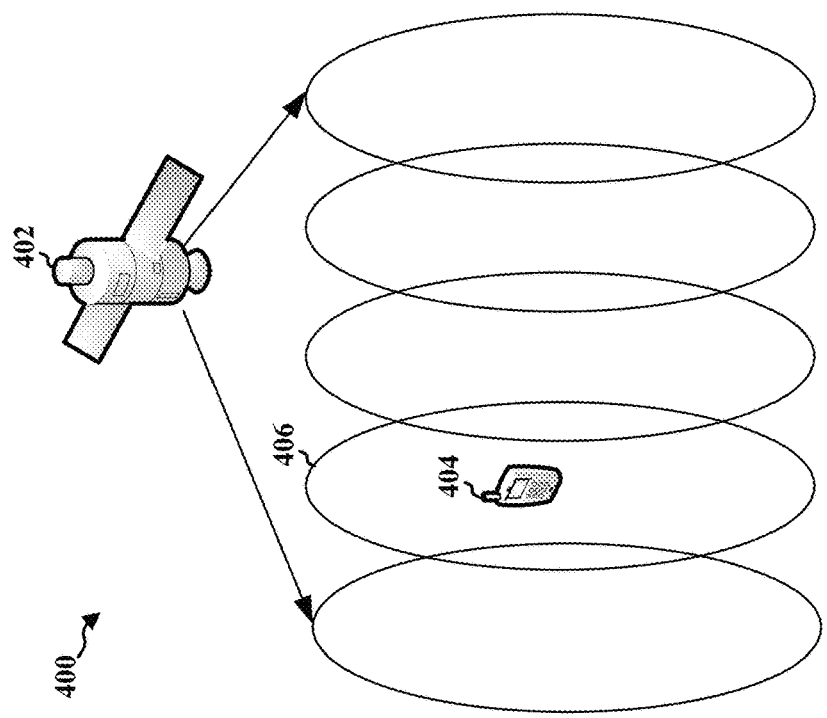

FIG. 4A is a diagram 400 illustrating an NTN device 402, which may also be referred to as a network device, in communication with a UE 404. Referring to FIG. 4A, the NTN device 402 may be equipped with antennas that provide a coverage area with multiple beam footprints to cover a wide area. In some aspects, such antennas may be referred to as venetian blind antennas. The area 406 in which the UE 404 is located may be associated with one particular beam. Accordingly, the NTN device 402 may transmit a beamformed signal to the UE 404 based on the area 406 in which the UE is located. The UE 404 may also transmit a beamformed signal to the NTN device 402 based on the beam associated with the area 406. The NTN device 402 may receive the beamformed signal from the UE 404. The term beam may be otherwise referred to as "spatial filter". Beamforming may be otherwise referred to as "spatial filtering". A transmission configuration indication (TCI) state may be associated with the beam. A TCI state may include Quasi co-location (QCL) information that the UE can use to derive timing/frequency error and/or transmission/reception spatial filtering for transmitting/receiving a signal. Two antenna ports are said to be quasi co-located if properties of the channel over which a symbol on one antenna port is conveyed can be inferred from the channel over which a symbol on the other antenna port is conveyed.

FIG. 4B illustrates radio cells produced by a non-terrestrial network (NTN) device 402 over an area 450 that includes a number of Earth-fixed cells 452, as presented herein. A radio cell may comprise a single beam or multiple beams, e.g., all beams in a radio cell may use the same frequency or a radio cell may comprise one beam for each frequency in a set of different frequencies. For example, beams B1, B2, and B3 may support three separate radio cells (one beam per radio cell) or may collectively support a single radio cell (e.g., a radio cell 454 shown with dotted lines). A radio cell may or may not cover a single contiguous area.

Radio beams and radio cells produced by the NTN device 402 may not align with cells used by terrestrial wireless networks, e.g., NR terrestrial cells or LTE terrestrial cells. For example, in an urban area, a radio beam or radio cell produced by the NTN device 402 may overlap with many terrestrial cells.

In the example of FIG. 4B, cell B1 may be moving based on movements of the NTN device 402 and corresponding movements associated with the beam projected by the NTN device 402. The NTN device 402 may be transparent or may be a relay for base stations on the ground (e.g., as described in connection with the example of FIG. 5A). In examples, the NTN device 402 may be a base station, as described in connection with the examples of FIGS. 5B-5C.

In the example of FIG. 4B, because the cell B1 is being projected by the NTN device 402, the coverage area of the cell B1 may change over time. That is, at time T1, the cell B1 may be served by the NTN device 402. At a later time (e.g., at time T2), the cell B1 may be turned off and a new cell may be activated. The new cell may be located in the same region as the first cell (e.g., the cell B1). The new cell may be projected by the NTN device 402 or may be projected by a second NTN device (e.g., second satellite).

Figure 5A:
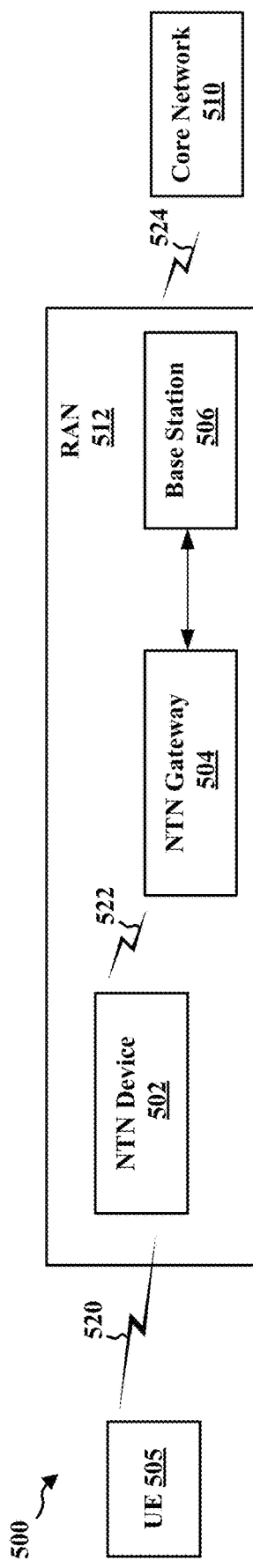
FIGS. 5A, 5B, and 5C illustrate example aspects of a network architecture that supports communication via an NTN device, in accordance with various aspects of the present disclosure.

FIG. 5A illustrates an example network architecture 500 capable of supporting NTN access, e.g., using 5G NR, as presented herein. Although the aspects are described using the example of 5G NR, the concepts presented herein may also be applied for other types of core networks. FIG. 5A illustrates a network architecture with transparent payloads. While aspects of FIG. 5A illustrate a 5G-based network, similar network implementations and configurations may be used for other communication technologies, such as 3G, 4G LTE, etc.

The network architecture 500 of FIG. 5A includes a UE 505, an NTN device 502, an NTN gateway 504 (sometimes referred to as "gateways," "earth stations," or "ground stations"), and a base station 506 having the capability to communicate with the UE 505 via the NTN device 502. The NTN device 502, the NTN gateway 504, and the base station 506 may be part of a RAN 512 (e.g., an NG RAN).

The base station 506 may be a network node that corresponds to the network device 310 of FIG. 3. The network architecture 500 is illustrated as further including a core network 510. In some aspects, the core network 510 may include a number of Fifth Generation (5G) networks including 5G Core Networks (5GCNs) and may correspond to the core network 190 described in connection with FIG. 1. The core network 510 may be public land mobile networks (PLMN). In some aspects, the core network may be 5GCNs.

Permitted connections in the network architecture 500 with transparent payloads illustrated in FIG. 5A, allow the base station 506 to access the NTN gateway 504 and the core network 510. In some examples, the base station 506 may be shared by multiple PLMNs. Similarly, the NTN gateway 504 may be shared by more than one base station.

FIG. 5A provides a generalized illustration of various components, any or all of which may be utilized as appropriate, and each of which may be duplicated or omitted, as necessary. Specifically, although the example of FIG. 5A includes one UE 505, it should be understood that many UEs (e.g., hundreds, thousands, millions, etc.) may utilize the network architecture 500. Similarly, the network architecture 500 may include a larger (or smaller) number of NTN devices, NTN gateways, base stations, RAN, core networks, and/or other components. The illustrated connections that connect the various components in the network architecture 500 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 505 is configured to communicate with the core network 510 via the NTN device 502, the NTN gateway 504, and the base station 506. As illustrated by the RAN 512, one or more RANs associated with the core network 510 may include one or more base stations. Access to the network may be provided to the UE 505 via wireless communication between the UE 505 and the base station 506 (e.g., a serving base station), via the NTN device 502 and the NTN gateway 504. The base station 506 may provide wireless communications access to the core network 510 on behalf of the UE 505, e.g., using 5G NR.

The base station 506 may be referred to by other names such as a gNB, a "satellite node", a satellite NodeB (sNB), "satellite access node", etc. The base station 506 may not be the same as terrestrial network gNB s, but may be based on a terrestrial network gNB with additional capability. For example, the base station 506 may terminate the radio interface and associated radio interface protocols to the UE 505 and may transmit DL signals to the UE 505 and receive UL signals from the UE 505 via the NTN device 502 and the NTN gateway 504. The base station 506 may also support signaling connections and voice and data bearers to the UE 505 and may support handover of the UE 505 between different radio cells for the NTN device 502, between different NTN devices and/or between different base stations. The base station 506 may be configured to manage moving radio beams (e.g., for airborne vehicles and/or non-geostationary (non-GEO) devices) and associated mobility of the UE 505. The base station 506 may assist in the handover (or transfer) of the NTN device 502 between different NTN gateways or different base stations. In some examples, the base station 506 may be separate from the NTN gateway 504, e.g., as illustrated in the example of FIG. 5A. In other examples, the base station 506 may include or may be combined with one or more NTN gateways, e.g., using a split architecture. For example, with a split architecture, the base station 506 may include a Central Unit (CU), such as the example CU 106 of FIG. 1, and the NTN gateway 504 may include or act as Distributed Unit (DU), such as the example DU 105 of FIG. 1. The base station 506 may be fixed on the ground with transparent payload operation. In one implementation, the base station 506 may be physically combined with, or physically connected to, the NTN gateway 504 to reduce complexity and cost.

The NTN gateway 504 may be shared by more than one base station and may communicate with the UE 505 via the NTN device 502. The NTN gateway 504 may be dedicated to one associated constellation of NTN devices. The NTN gateway 504 may be included within the base station 506, e.g., as a base station-DU within the base station 506. The NTN gateway 504 may communicate with the NTN device 502 using control and user plane protocols. The control and user plane protocols between the NTN gateway 504 and the NTN device 502 may: (i) establish and release the NTN gateway 504 to the NTN device 502 communication links, including authentication and ciphering; (ii) update NTN device software and firmware; (iii) perform NTN device Operations and Maintenance (O&M); (iv) control radio beams (e.g., direction, power, on/off status) and mapping between radio beams and NTN gateway UL and DL payload; and/or (v) assist with handoff of the NTN device 502 or radio cell to another NTN gateway.

Support of transparent payloads with the network architecture 500 shown in FIG. 5A may impact the communication system as follows. The core network 510 may treat a satellite RAT as a new type of RAT with longer delay, reduced bandwidth and/or higher error rate. Consequently, there may be some impact to PDU session establishment and mobility management (MM) and connection management (CM) procedures. The NTN device 502 may be shared with other services (e.g., satellite television, fixed Internet access) with 5G NR mobile access for UEs added in a transparent manner. This may enable legacy NTN devices to be used and may avoid the need to deploy a new type of NTN device. The base station 506 may assist assignment and transfer of the NTN device 502 and radio cells between the base station 506 and the NTN gateway 504 and support handover of the UE 505 between radio cells, NTN devices, and other base stations. Thus, the base station 506 may differ from a terrestrial network gNB. Additionally, a coverage area of the base station 506 may be much larger than the coverage area of a terrestrial network base station.

In the illustrated example of FIG. 5A, a service link 520 may facilitate communication between the UE 505 and the NTN device 502, a feeder link 522 may facilitate communication between the NTN device 502 and the NTN gateway 504, and an interface 524 may facilitate communication between the base station 506 and the core network 510. The service link 520 and the feeder link 522 may be implemented by a same radio interface (e.g., the NR-Uu interface). The interface 524 may be implemented by the NG interface.

Figure 5B:
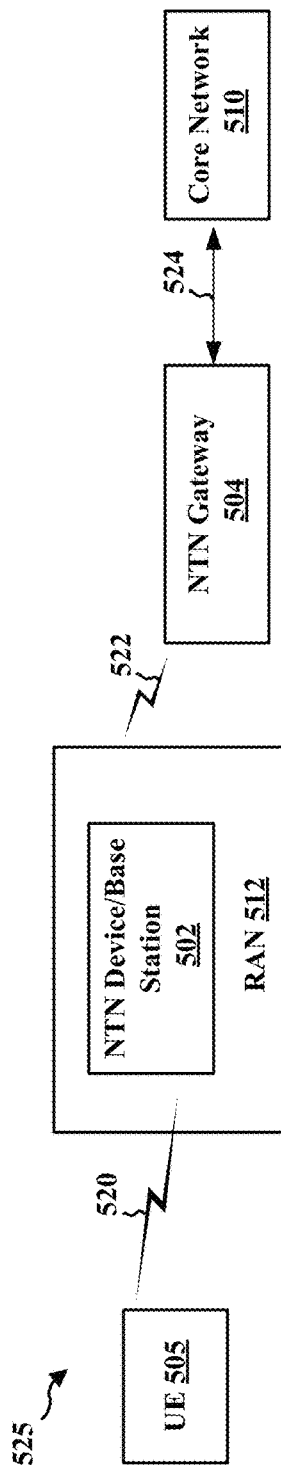

FIG. 5B shows a diagram of a network architecture 525 capable of supporting NTN access, e.g., using 5G NR, as presented herein. The network architecture 525 shown in FIG. 5B is similar to that shown in FIG. 5A, like designated elements being similar or the same. FIG. 5B, however, illustrates a network architecture with regenerative payloads, as opposed to transparent payloads shown in FIG. 5A. A regenerative payload, unlike a transparent payload, includes an on-board base station (e.g., includes the functional capability of a base station), and is referred to herein as an NTN device 502/base station. The on-board base station may be a network node that corresponds to the network device 310 in FIG. 3. The RAN 512 is illustrated as including the NTN device 502/base station. Reference to the NTN device 502/base station may refer to functions related to communication with the UE 505 and the core network 510 and/or to functions related to communication with the NTN gateway 504 and with the UE 505 at a physical radio frequency level.

An on-board base station may perform many of the same functions as the base station 506 as described previously. For example, the NTN device 502/base station may terminate the radio interface and associated radio interface protocols to the UE 505 and may transmit DL signals to the UE 505 and receive UL signals from the UE 505, which may include encoding and modulation of transmitted signals and demodulation and decoding of received signals. The NTN device 502/base station may also support signaling connections and voice and data bearers to the UE 505 and may support handover of the UE 505 between different radio cells for the NTN device 502/base station and between or among different NTN device/base stations. The NTN device 502/base station may assist in the handover (or transfer) of the UE 505 between different NTN gateways and different control networks. The NTN device 502/base station may hide or obscure specific aspects of the NTN device 502/base station from the core network 510, e.g., by interfacing to the core network 510 in the same way or in a similar way to a terrestrial network base station. The NTN device 502/base station may further assist in sharing of the NTN device 502/base station. The NTN device 502/base station may communicate with one or more NTN gateways and with one or more core networks via the NTN gateway 504. In some aspects, the NTN device 502/base station may communicate directly with other NTN device/base stations using Inter-Satellite Links (ISLs), which may support an Xn interface between any pair of NTN device/base stations.

With low Earth orbit (LEO) devices, the NTN device 502/base station may manage moving radio cells with coverage at different times. The NTN gateway 504 may be connected directly to the core network 510, as illustrated. The NTN gateway 504 may be shared by multiple core networks, for example, if NTN gateways are limited. In some examples the core network 510 may need to be aware of coverage area(s) of the NTN device 502/base station in order to page the UE 505 and to manage handover. Thus, as can be seen, the network architecture 525 with regenerative payloads may have more impact and complexity with respect to both the NTN device 502/base station and the core network 510 than the network architecture 500 including transparent payloads, as shown in FIG. 5A.

Support of regenerative payloads with the network architecture 525 shown in FIG. 5B may impact the network architecture 525 as follows. The core network 510 may be impacted if fixed tracking areas and fixed cells are not supported, because core components of mobility management and regulatory services, which are based on fixed cells and fixed tracking areas for terrestrial PLMNs, may be replaced by a new system (e.g., based on a location of the UE 505). If fixed tracking areas and fixed cells are supported, the core network 510 may map any fixed tracking area to one or more NTN device/base stations with current radio coverage of the fixed tracking area when performing paging of the UE 505 that is located in this fixed tracking area. This could include configuration in the core network 510 of long term orbital data for the NTN device 502/base station (e.g., obtained from an operator of the NTN device 502/base station) and could add significant new impact to core network 510.

In the illustrated example of FIG. 5B, a service link 520 may facilitate communication between the UE 505 and the NTN device 502/base station, a feeder link 522 may facilitate communication between the NTN device 502/base station and the NTN gateway 504, and an interface 524 may facilitate communication between the NTN gateway 504 and the core network 510. The service link 520 may be implemented by the NR-Uu interface. The feeder link 522 may be implemented by the NG interface over SRI. The interface 524 may be implemented by the NG interface.

Figure 5C:
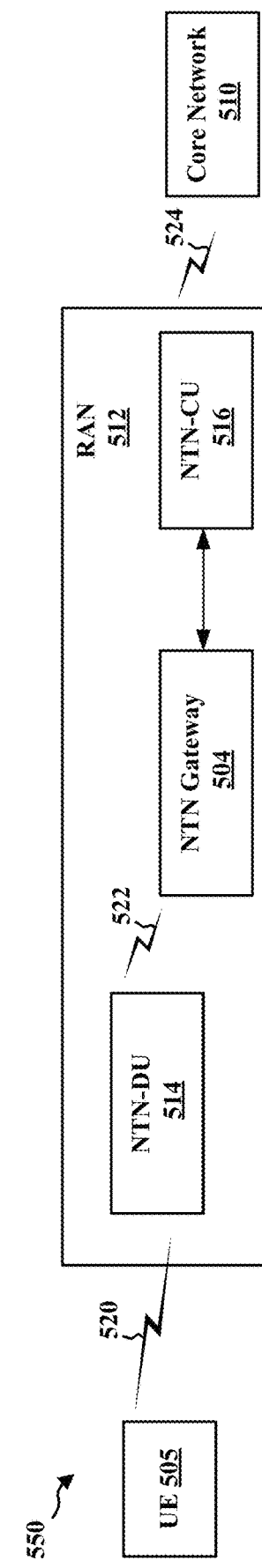

FIG. 5C shows a diagram of a network architecture 550 capable of supporting NTN access, e.g., using 5G NR, as presented herein. The network architecture shown in FIG. 5C is similar to that shown in FIGS. 5A and 5B, like designated elements being similar or the same. FIG. 5C, however, illustrates a network architecture with regenerative payloads, as opposed to transparent payloads, as shown in FIG. 5A, and with a split architecture for the base station. For example, the base station may be split between a Central Unit (CU), such as the CU 106 of FIG. 1, and a Distributed Unit (DU), such as the DU 105 of FIG. 1. In the illustrated example of FIG. 5C, the network architecture 550 includes an NTN-CU 516, which may be a ground-based base station or a terrestrial base station. The regenerative payloads include an on-board base station DU, and is referred to herein as an NTN-DU 514. The NTN-CU 516 and the NTN-DU 514, collectively or individually, may correspond to the network node associated with the network device 310 in FIG. 3.

The NTN-DU 514 communicates with the NTN-CU 516 via the NTN gateway 504. The NTN-CU 516 together with the NTN-DU 514 perform functions, and may use internal communication protocols, which are similar to or the same as a gNB with a split architecture. In the example, the NTN-DU 514 may correspond to and perform functions similar to or the same as a gNB Distributed Unit (gNB-DU), while the NTN-CU 516 may correspond to and perform functions similar to or the same as a gNB Central Unit (gNB-CU). However, the NTN-CU 516 and the NTN-DU 514 may each include additional capability to support the UE 505 access using NTN devices.

The NTN-DU 514 and the NTN-CU 516 may communicate with one another using an F1 Application Protocol (FLAP), and together may perform some or all of the same functions as the base station 506 or the NTN device 502/base station as described in connection with FIGS. 5B and 5C, respectively.

The NTN-DU 514 may terminate the radio interface and associated lower level radio interface protocols to the UE 505 and may transmit DL signals to the UE 505 and receive UL signals from the UE 505, which may include encoding and modulation of transmitted signals and demodulation and decoding of received signals. The operation of the NTN-DU 514 may be partly controlled by the NTN-CU 516. The NTN-DU 514 may support one or more NR radio cells for the UE 505. The NTN-CU 516 may also be split into separate control plane (CP) (NTN-CU-CP) and user plane (UP) (NTN-CU-UP) portions. The NTN-DU 514 and the NTN-CU 516 may communicate over an F1 interface to (a) support control plane signaling for the UE 505 using IP, Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

The NTN-CU 516 may communicate with one or more other NTN-CUs and/or with one more other terrestrial base stations using terrestrial links to support an Xn interface between any pair of NTN-CUs and/or between the NTN-CU 516 and any terrestrial base station.

The NTN-DU 514 together with the NTN-CU 516 may: (i) support signaling connections and voice and data bearers to the UE 505; (ii) support handover of the UE 505 between different radio cells for the NTN-DU 514 and between different NTN-DUs; and (iii) assist in the handover (or transfer) of NTN devices between different NTN gateways or different core networks. The NTN-CU 516 may hide or obscure specific aspects of the NTN devices from the core network 510, e.g., by interfacing to the core network 510 in the same way or in a similar way to a terrestrial network base station.

In the network architecture 550 of FIG. 5C, the NTN-DU 514 that communicates with and is accessible from an NTN-CU may change over time with LEO devices. With the split base station architecture, the core network 510 may connect to NTN-CUs that are fixed and that do not change over time, which may reduce difficulty with paging of the UE 505. For example, the core network 510 may not need to know which NTN-DU is needed for paging the UE 505. The network architecture with regenerative payloads with a split base station architecture may thereby reduce the core network 510 impact at the expense of additional impact to the NTN-CU 516.

Support of regenerative payloads with a split base station architecture, as shown in FIG. 5C, may impact the network architecture 550 as follows. The impact to the core network 510 may be limited as for the transparent payloads (e.g., the NTN device 502) discussed above. For example, the core network 510 may treat a satellite RAT in the network architecture 550 as a new type of RAT with longer delay, reduced bandwidth and/or higher error rate. The impact on the NTN-DU 514 may be less than the impact on NTN device/base stations (e.g., the NTN device 502/base station with a non-split architecture), as discussed above in reference to FIG. 5B. The NTN-DU 514 may manage changing association with different (fixed) NTN-CUs. Further, the NTN-DU 514 may manage radio beams and radio cells. The NTN-CU 516 impacts may be similar to the impact of the base station 506 for a network architecture with transparent payloads, as discussed above, except for extra impacts to manage changing associations with different NTN-DUs and reduced impacts to support radio cells and radio beams, which may be transferred to the NTN-DU 514.

Referring again to the examples of FIG. 4A or 4B, the NTN device 402 may correspond to a high altitude platform system (HAPS) that serves one or more UEs on the ground. The NTN device 402 may project beams toward receivers on the ground to provide a serving area within the area 450 for a cell of the NTN device 402. The NTN device 402 may use directional beams for communication with one or more ground-based devices. Due to the aerial distance of the NTN device, a coverage area of a beam may have a larger size, e.g., a larger footprint than a beam of a terrestrial network device. For example, the NTN device 402 may project a single beam per cell or multiple beams per cell to provide the serving area. Each beam projected by the NTN device 402 may have a corresponding beam footprint on the ground. Thus, the cell of the NTN device 402 may have an area associated with one or more beam footprints. In an example, the NTN device 402 may project beams B 1, B2, and B3, which may each have corresponding beam footprints that comprise the radio cell 454 of the NTN device 402, where the radio cell 454 may correspond to the serving area. The footprints of beams B1, B2, and B3 may be overlapping footprints, partially overlapping footprints, or non-overlapping footprints in various configurations.

The base station may indicate a TCI state to the UE as a transmission configuration that indicates QCL relationships between one signal (e.g., a reference signal, a synchronization signal) and the signal to be transmitted/received. For example, a TCI state may indicate a QCL relationship between DL RSs/SSBs in one RS/SSB set and PDSCH/PDCCH DMRS ports. TCI states may provide information about different beam selections for the UE to use for transmitting/receiving various signals.

Figure 6:
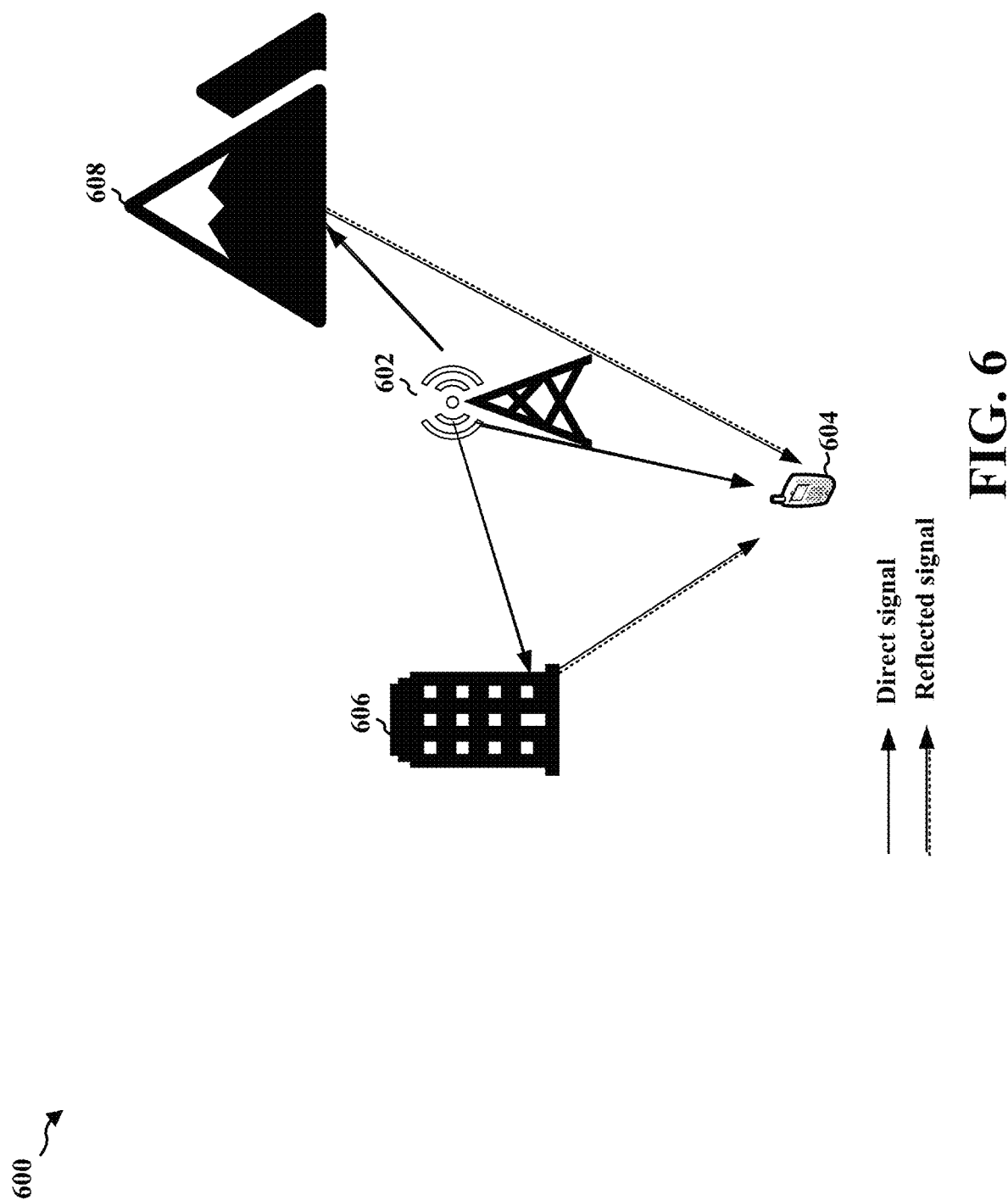
FIG. 6 is a diagram illustrating an example of signal reflection within a terrestrial network.

In a TN, a reflection of multiple beams may reach a same UE simultaneously. For example, as illustrated in example 600 of FIG. 6, in a TN, a base station 602 may transmit a signal to the UE 604 and the UE may receive the signal from the base station 602 directly. The UE 604 may also receive a reflection of a signal transmitted by the base station 602 in a different beam direction that is reflected by the mountain 608. The UE 604 may receive a reflection of an additional signal transmitted by the base station 602 in yet another beam direction that is reflected by the building 606. The signal received by the UE 505 may thus be received via multiple beam, e.g., based on one or more reflected signals. In contrast to a TN, reflections of the signal from an NTN may reflect back toward the sky and may not be received by the UE. The UE may receive a signal from a single beam, e.g., without reflections from other beams of the NTN. In some aspects, an NTN may have orthogonal footprints for different beams, and a TN may have non-orthogonal footprints for different beams.

In some wireless communication systems, SSB may be transmitted on a broadcast channel. FIG. 2B illustrates example aspects of an SSB. In each cell, a network node may transmit multiple SSBs, e.g. towards different directions, so that UEs throughout the cell coverage can receive an SSB and perform initial access based on the received SSB beam. In a TN, any transmitted SSB may reach the UE due to a reflection, such as described in connection with FIG. 6. When the base station schedules resource for downlink transmissions, the base station may avoid resources occupied by any SSB transmitted by the base station so that reception of the DL signal/channel may not be impacted by SSB transmissions. The base station may also avoid resources overlapping with transmitted SSBs when scheduling resource for UE UL transmission so that the UE may operate in a half-duplex mode instead of full duplex operation, e.g. without transmitting and receiving simultaneously. The term "simultaneously" may refer to at least a partial overlap in the time-domain.

As presented herein, an NTN node may schedule resources for transmissions differently compared with scheduling in a TN because, e.g., based on a reduced likelihood of signal reflections being received by the UE. Aspects provided herein may improve over the air (OTA) resource efficiency for a base station in an NTN scenario by providing scheduling mechanisms that handle collision with SSB more efficiently for an NTN scenario.

Figure 7:
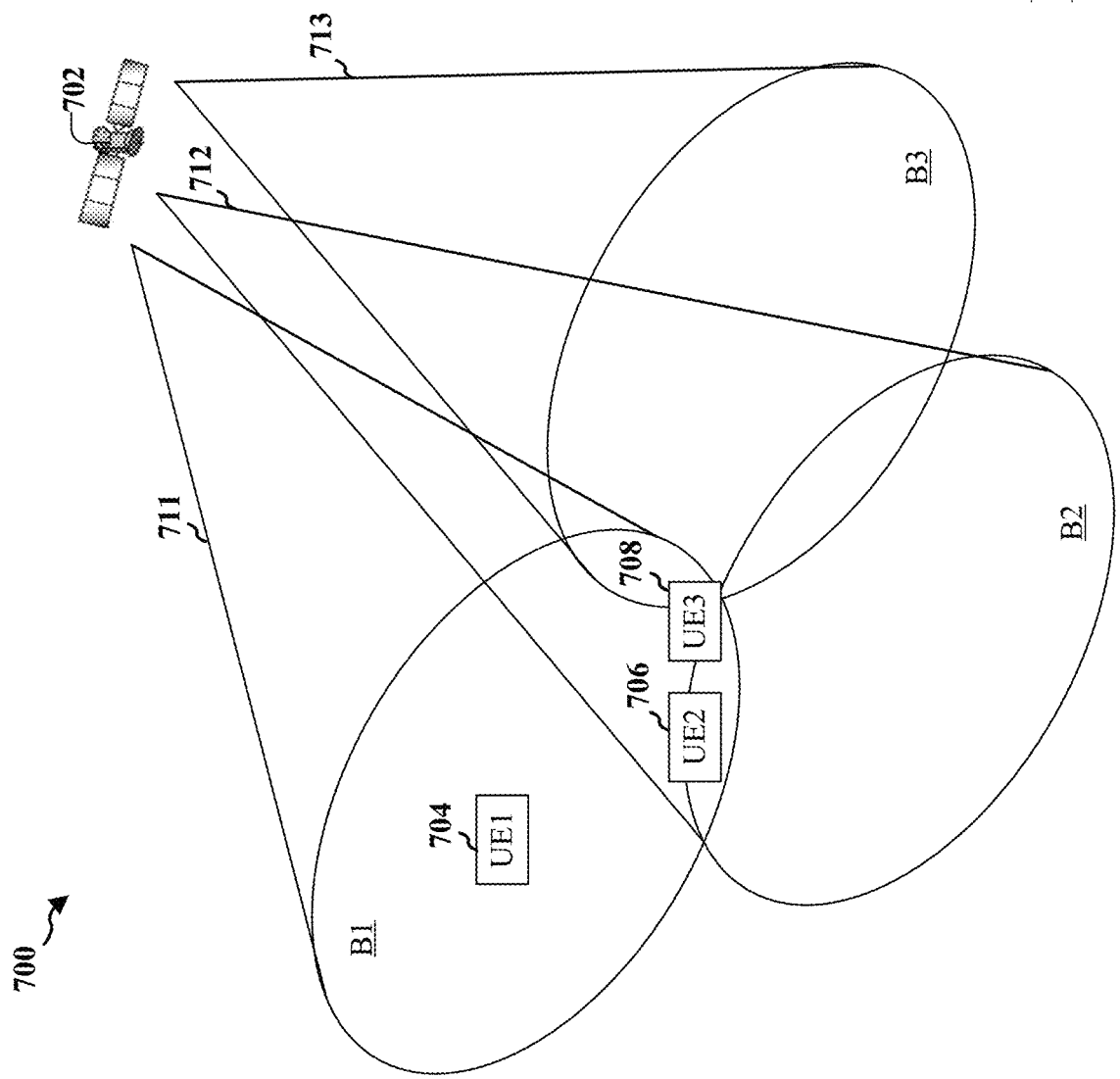
FIG. 7 illustrates an example of UE locations relative to a beam coverage area of an NTN device, in accordance with various aspects of the present disclosure.

In some aspects, an NTN node may skip resource conflict avoidance between the DL/UL signals and channels and one or more transmitted SSBs. In some aspects, the NTN node may avoid scheduling resources that conflict with, e.g., overlap in time and/or frequency with, a subset of the transmitted SSBs in a cell. In one example, the subset of SSBs may correspond to a reduced set that the UE may receive based on a location of the UE. FIG. 7 is a diagram 700 showing an example of coverage areas for multiple beams, e.g. multiple SSB beams of one cell, from an NTN device 702. In FIG. 7, a first beam 711 provides a coverage area B1, a second beam 712 provides a coverage area B2, and a third beam 713 provides a coverage area B3. The UE1 704 is likely to receive only a signal from the first beam 711. The UE2 706, based on its location at a boundary of the beam coverage area of B1 may receive signals from the first beam 711 and the second beam 712. The UE3 708 may receive signals from the first beam 711, the second beam 712, and the third beam 713, based on the location of the UE3. In some aspects, the NTN device may schedule communication resources for the UE1, whether downlink or uplink, that overlap in time with SSB resources for the second beam 712 and/or the third beam 713, as well as for other beams that are not illustrated, because the UE1 704 is unlikely to receive the SSB s on those beams. The NTN device 702 may schedule resources for the UE2 706 that overlap with the SSB resources for the third beam 713, yet may avoid scheduling resources that overlap with the SSB resources for the first beam 711 and the second beam 712 because the UE2 706 may receive the SSBs that the NTN transmits on the first beam 711 and the second beam 712. The NTN device 702 may avoid scheduling resources for the UE3 that overlap with the SSB resources for the first beam 711, the second beam 712 and the third beam 713, and may use resources that overlap with SSBs of other beams that are not illustrated.

Figure 8:
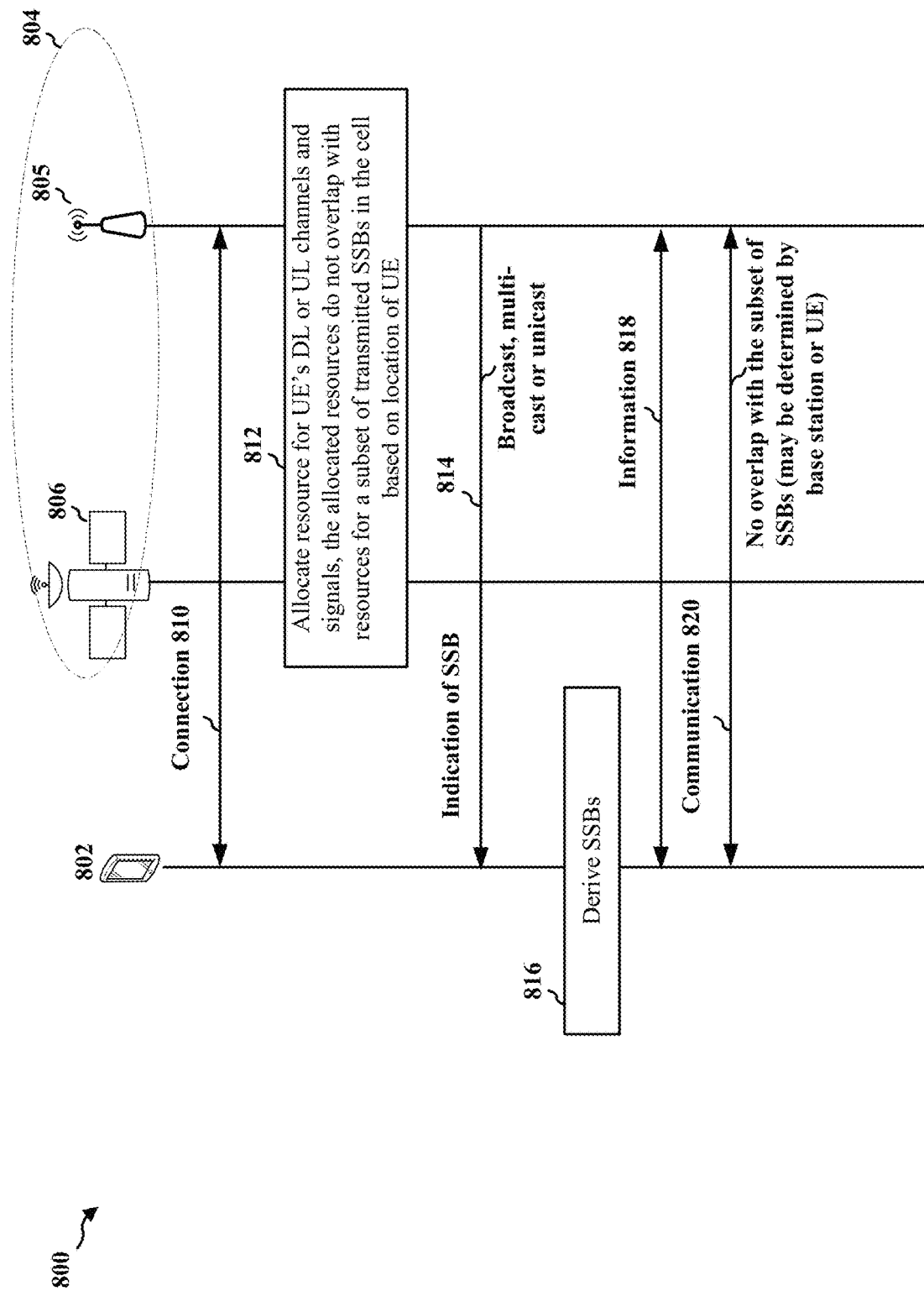
FIG. 8 is a diagram illustrating example communication flow between an NTN device and a UE, in accordance with various aspects of the present disclosure.

FIG. 8 is a diagram 800 illustrating example communication flow between an NTN device 806 and a UE 802. The NTN may have various configurations, such as described in connection with FIGS. 5A-5C. In some aspects, the NTN device 806 may include a satellite or other entities. In some aspects, the NTN device 806 may be implemented on a satellite, a drone, a balloon, among other examples of an NTN device. FIG. 8 illustrates an example in which the NTN 804 includes the NTN device 806 and another network node 805, which may be a gateway device, a base station, a combination of a gateway and a base station, etc. As illustrated in FIG. 8, at 810, the NTN 804 may establish a connection 810 with the UE 802. In some aspects, one or more SSBs may be transmitted from the NTN device 806. FIG. 2B illustrates example aspects of an SSB. The NTN 804 may transmit different SSBs using different beams, such as described in connection with FIG. 7.

In some aspects, at 812, the NTN 804 may determine a subset of SSBs that may be received by the UE with a high signal power/quality, e.g. a signal power higher than a particular threshold. The subset of SSBs may include the SSBs associated with one or more beams on which the UE 802 communicates with the NTN 804, which may be the serving beam for the UE 802. For example, in some aspects, the subset of SSBs may be the SSBs on beams having a highest quality for the UE. The beams may be the beams that the UE may be most likely to receive from the NTN device 806, such as described in connection with FIG. 7. In some aspects, the serving SSB may be based on a location of the UE. The serving SSB may refer to an SSB that is transmitted on a beam being used for communication with the UE. For example, in FIG. 7, the serving SSB may be an SSB transmitted on the first beam 711, e.g., based on the location of the UE1 within the coverage area of the first beam 711. The serving beam for the UE may depend on a geographic location of the UE, e.g., based on the LoS channel condition of NTN communication.

In some aspects, the subset of SSBs may further include one or more other transmitted SSBs. For example, for the UE2 in FIG. 7, the subset of SSBs may include an SSB on the first beam 711, which may be the UE2's serving beam, as well as an SSB on the second beam 712, based on the UE2's location at a beam coverage boundary for the beam coverage area B1 of the first beam 711 that is near, or overlaps with, the beam coverage area B2 for the second beam 712, which may increase a likelihood that the UE2 may receive the SSBs on both the serving beam, e.g. the first beam 711, and the non-serving beam, e.g. the second beam 712. For example, the one or more the other transmitted SSBs may be indicated by network at 814. In some aspects, the UE 802 may autonomously determine the subset of SSBs, e.g., based on one or more defined rules, at 816.

In some aspects, the one or more rules may be known by the UE, e.g., without explicit network signaling from network. In some aspects, the rules may be related with one or multiple TCI states configured at the UE. For example, in some aspects, the TCI states configured for the UE may have a relationship to the subset of SSBs for which resource conflicts will be avoided.

In some aspects, the subset of transmitted SSBs in the cell may be indicated by the NTN 804 in the indication at 814. In some aspects, the indication 814 may be broadcasted to all UEs within coverage of the NTN device 806. For example, the NTN device 806 may indicate to all UEs that if a UE is served by a particular SSB (e.g., SSB i), the UE's DL or UL transmission may avoid resources that overlap with a subset of transmitted SSBs including the SSB i and some other SSBs. As an example, for the first beam 711 in FIG. 7, the NTN device 702 may broadcast an indication that identifies the second beam 712 and the third beam 713, besides the first beam 711 as the serving beam.

In some aspects, the indication 814 may be UE specific and transmitted to the UE 802, such as via a unicast transmission to the UE 802. In some aspects, different UEs in the cell may receive different SSBs, e.g., SSBs from different beams, and may benefit from higher resource efficiency through a UE specific indication. As an example, in FIG. 7, the NTN device 702 may indicate the first beam 711 to the UE1 as the subset of SSB beams, may indicate the first beam 711 and the second beam 712 to the UE2 as the subset of SSB beams, and may indicate the first beam 711, the second beam 712, and the third beam 713 to the UE3 as the subset of SSB beams. The UE specific indications may enable the UE1 and the UE2 to receive resource allocations that overlap with an SSB resource for the third beam 713, while indicating to the UE3 that resources that conflict with the resources for the SSB transmitted on the third beam 713 will be avoided for the UE3. The different indications enable the NTN to differentiate between different UEs that may receive different SSBs. In some aspects, a UE may receive reflections from non-serving beams.

As an example, users in the airplane may receive signal reflections from non-serving beams. In some aspects, the subset of SSBs may be configured based on the UE 802's altitude or UE 802's antenna direction. For example, even though different UEs may be served by the same beam, the UEs may have different subsets of SSBs based on their different altitudes or antenna directions. For example, antenna direction, antenna type (directional or omni-directional), or other radio performance related hardware specifications may be considered in configuring the subset of SSBs for which the communication between the UE and the network will avoid using the conflicted resource. In some aspects, whether the UE 802 is on a beam edge may be considered in determining the subset of SSBs. For example, UEs near a beam edge may receive SSBs on more beams than UEs located in the beam center, e.g., as illustrated in the example in FIG. 7.

In some aspects, the indication 814 may be multi-casted, or groupcast, to one or more UEs including the UE 802. The UEs that may receive the same set of SSBs may be in a same group and a common signaling may be used to indicate the subset of SSBs. Multi-casting may introduce less signaling overhead than UE specific indications. In some aspects, if the UE 802 is in a connected mode, the NTN 804 may be aware of the serving beam SSB i of the UE 802 and/or a beam measurement by the UE 802.

In some aspects, at 816, the UE 802 may derive the subset of SSBs based on the defined rules. In some aspects, the rules for the UE 802's identification of the subset of SSBs may be based on various information. For example, a rule may be based on network broadcast of parameters that may be used by the UE 802 to derive footprints (e.g., area of coverage) of transmitted SSBs in the cell. As one example, based on the derived footprints of different SSBs, potentially together with the UE's own location information, UE 802 may further determine the subset of SSB(s) that can be received with a high signal power/quality. Afterwards, the determined subset of SSBs will be used to avoid using the conflicting/overlapping resources for the communication between UE 802 and the network. In some aspects, the UE 802 may use additional information as the input for the rule, such as the UE's location (e.g., edge or center of the serving beam), height (on the ground or onboard in the sky), antenna type (directional or omnidirectional), or the like. In some aspects, as an example, the UE 802 may determine that the UE is located at a beam center, or more than a threshold distance from a beam edge, and may accordingly assume that resources overlapping with serving SSB beam (e.g., and no other SSB beams) are to be avoided in the UL and DL channels or signals for the UE 802. A UE that has a location closer to an edge of the beam may determine that the resources overlapping with the serving SSB beam and at least one adjacent SSB beam are to be avoided in the UL and DL channels or signals for the UE 802.

In some aspects, as an example, the UE 802 may be in the sky onboard an airplane and may apply a corresponding rule for avoiding resources that overlap with the resources used for transmitting a subset of SSBs. In some aspects, the corresponding rule may indicate that resources that overlap with any SSB (e.g., of each beam) are to be avoided. In some aspects, the UE 802 may be equipped with directional antenna and may accordingly determine that resources of a smaller set of transmitted SSBs are to be avoided, e.g., a smaller set of SSBs than a UE equipped with an omnidirectional/isotropic antenna. In some aspects, the UE may transmit such additional information and/or the resulted UE decision to the NTN 804 in information 818, which may enable the UE 802 and the network to have a same understanding of the subset of SSBs for which resource conflicts (e.g., allocation of resources overlapping with the SSB resources) are to be avoided. In some aspects, such additional information may be transmitted to the network before 812, such that NW may determine the subset of SSB beams in 812 by taking account of such additional information.

In some aspects, the rule or identification of the subset of SSBs may be based on a TCI configuration for the UE 802. For example, the subset of SSBs for which conflicting resource allocation is to be avoided may be based on one or more of a TCI-related parameter, a TCI state, or a parameter indicating an association between a TCI state and PDSCH. For example, a TCI-related parameter such as a new TCI-related information element (IE) may be used to identify the subset of SSBs. As another example, configured TCI state(s) for PDCCH or PDSCH, may be used to identify the subset of SSBs, e.g., based on a parameter reflecting association between TCI states and PDCCH such as a tci-StatesPDCCH-ToAddList in a control resource set (CORESET) configuration. As another example, a parameter reflecting an association between TCI states and PDSCH such as tci-StatesToAddModList in PDSCH configuration, or the TCI state(s) activated by medium access control (MAC) control element (CE) (MAC-CE) may be used to identify the subset of SSBs. In one example, the SSB beam(s) quasi-collocated (QCL-ed) with a subset or the entire set of the TCI states listed in the configured tci-StatesPDCCH-ToAddList at the UE 802 may be considered as the subset of SSBs.

In some aspects, the UE 802 and the NTN 804 may communicate at 820 based on the subset of SSBs for which resource conflicts are to avoided for UL and DL communication. In some aspects, the UE 802 may not monitor a PDCCH candidate if the PDCCH collides (e.g., overlaps in time and/or frequency) with any transmitted SSB in the subset of SSBs. In some aspects, the NTN 804 may schedule and transmit PDCCH wideband DMRS to not collide with any transmitted SSB in the subset of SSBs. In some aspects, downlink control information (DCI), such as DCI of format 2_0 (for notifying a group of UEs of slot format information) may not configure a symbol as uplink if the symbol collides (e.g., overlaps in time and/or frequency) with any SSB in the subset of SSBs transmitted in the cell. In some aspects, the UE 802 may not transmit PUSCH, PUCCH or physical random access channel (PRACH) with a symbol of any transmitted SSB (e.g., in the subset of SSBs) within a cell. In some aspects, if the UE 802 is not capable of full-duplex operations, the UE 802 may not transmit PUSCH, PUCCH, or PRACH in any serving cell if there is a collision with any of another serving cell's transmitted SSB (e.g., in the subset of SSBs) in a symbol used for PUSCH, PUCCH, or PRACH.

In some aspects, as an example, for monitoring of a PDCCH candidate by the UE 802, if the UE 802 has 1) received an SSB position such as indicated by a ssb-PositionsInBurst parameter (that indicates the UE which SSBs and the time domain positions of the SSBs that are transmitted) in system information block type 1 (SIB1) (that carries information relevant when evaluating if a UE is allowed to access a cell and defines the scheduling of other system information) and has not received a ssb-PositionsIn-Burst parameter in a serving cell configuration (e.g., indicated by ServingCellConfigCommon parameter) for a serving cell and 2) does not monitor PDCCH candidates in a Type 0-PDCCH common search space (CSS) set (which may be a subset of NR PDCCH Search Space that is dedicated to transmit the PDCCH for SIB) and 3) at least one RE for a PDCCH candidate overlaps with at least one RE of a candidate SS/PBCH block in a subset of SSBs (that may be previously indicated or determined based on any of the example aspects presented herein) corresponding to a SS/PBCH block index provided by ssb-PositionsInBurst in SIB1, the UE may not monitor (or may not be specified to monitor) the PDCCH candidate.

In some aspects, for monitoring of a PDCCH candidate by a UE, if the UE 1) has received ssb-PositionsInBurst in ServingCellConfigCommon for a serving cell, 2) does not monitor PDCCH candidates in a Type0-PDCCH CSS set, and 3) at least one RE for a PDCCH candidate overlaps with at least one RE of a candidate SS/PBCH block in the subset of SSBs (that may be indicated or determined based on any of the example aspects presented herein) corresponding to a SS/PBCH block index provided by ssb-PositionsInBurst in ServingCellConfigCommon, the UE may not monitor (or may not be specified to monitor) the PDCCH candidate. If a UE monitors the PDCCH candidate for a Type0-PDCCH CSS set on the serving cell, the UE may assume that no SS/PBCH block in the subset of SSBs (that may be indicated or determined based on any of the example aspects presented herein) is transmitted in REs used for monitoring the PDCCH candidate on the serving cell.

In some aspects, when a precoder granularity is for all contiguous RBs, the UE may not expect to be configured a set of resource blocks of a CORESET that includes more than four sub-sets of resource blocks that are not contiguous in frequency and may not expect any RE of a CORESET to overlap with any RE determined from a pattern list or a cell reference signal (CRS), or with any RE of a SS/PBCH block in the subset of SSBs (that may be indicated or determined based on any of the example aspects presented herein).

In some aspects, for a set of symbols of a slot corresponding to SS/PBCH blocks in the subset of SSBs (that may be indicated or determined based on any of the example aspects presented herein) with candidate SS/PBCH block indices corresponding to the SS/PBCH block indexes indicated to a UE by ssb-PositionsInBurst in SIB1, or by ssb-PositionsIn-Burst in ServingCellConfigCommon, the UE may not expect to detect a DCI format 2_0 with an slot format indicator (SFI) index field value indicating the set of symbols of the slot as uplink.

In some aspects, for operation on a single carrier in unpaired spectrum, for a set of symbols of a slot in the subset of SSBs (that may be indicated or determined based on any of the example aspects presented herein) indicated to a UE by ssb-PositionsInBurst in SIB1 or ssb-PositionsInBurst in ServingCellConfigCommon, for reception of SS/PBCH blocks, the UE may not transmit PUSCH, PUCCH, PRACH in the slot if a transmission would overlap with any symbol from the set of symbols and the UE does not transmit SRS in the set of symbols of the slot. The UE may not expect the set of symbols of the slot to be indicated as uplink by a time division duplex UL or DL configuration (such as tdd-UL-DL-ConfigurationCommon or tdd-UL-DL-Configuration-Dedicated), when provided to the UE.

In some aspects, a PUSCH occasion is valid if it does not overlap in time and frequency with valid PRACH occasion associated with either a Type-1 random access procedure or a Type-2 random access procedure. Additionally, for unpaired spectrum and for SS/PBCH blocks with indexes provided by ssb-PositionsInBurst in SIB1 or by Serving-CellConfigCommon, if a UE is not provided tdd-UL-DL-ConfigurationCommon, a PUSCH occasion is valid if the PUSCH occasion 1) does not precede a SS/PBCH block in the subset of SSBs (that may be previously indicated or derived) and starts at least $N_{gap}$ symbols (which may be defined) after a las.

SS/PBCH block symbol if the SS/PBCH block is in a set of SS/PBCH blocks in the subset of SSBs (that may be indicated or determined based on any of the example aspects presented herein) and if channel access mode being semi-static is provided and the $N_{gap}$ symbols does not overlap with a set of consecutive symbols before the start of a next channel occupancy time where the UE does not transmit.

In some aspects, for unpaired spectrum and for SS/PBCH blocks with indexes provided by ssb-PositionsInBurst in SIB1 or by ServingCellConfigCommon, if a UE is provided tdd-UL-DL-ConfigurationCommon, a PUSCH occasion is valid if the PUSCH occasion 1) is within UL symbols, or 2) does not precede a SS/PBCH block in a set of SS/PBCH blocks in the subset of SSBs (that may be previously indicated or derived) in the PUSCH slot, and 3) starts at least $N_{gap}$ symbols after a last downlink symbol and at least $N_{gap}$ symbols after a last SS/PBCH block symbol if the SS/PBCH block is in a set of SS/PBCH blocks in the subset of SSBs that may be indicated or determined based on any of the example aspects presented herein), where the $N_{gap}$ symbols does not overlap with a set of consecutive symbols before the start of a next channel occupancy time where the UE does not transmit.

In some aspects, for unpaired spectrum, if a UE is not provided tdd-UL-DL-ConfigurationCommon, a PRACH occasion in a PRACH slot is valid if it does not precede a SS/PBCH block in the PRACH slot and starts at least $N_{gap}$ symbols after a last SS/PBCH block reception symbol if the SS/PBCH block is in a set of SS/PBCH blocks in the subset of SSBs (that may be previously indicated or derived), if channel access mode being semi-static is provided and the $N_{gap}$ symbols does not overlap with a set of consecutive symbols before the start of a next channel occupancy time where the UE does not transmit. In some aspects, the candidate SS/PBCH block index of the SS/PBCH block corresponds to the SS/PBCH block index in a set of SS/PBCH blocks in the subset of SSBs (that may be indicated or determined based on any of the example aspects presented herein) provided by ssb-PositionsInBurst in SIB1 or in ServingCellConfigCommon.

In some aspects, if a UE is provided tdd-UL-DL-ConfigurationCommon, a PRACH occasion in a PRACH slot is valid if 1) it is within UL symbols, or 2) it does not precede a SS/PBCH block in the PRACH slot and starts at least $N_{gap}$ symbols after a last downlink symbol and at least $N_{gap}$ symbols after a last SS/PBCH block symbol if the SS/PBCH block index in a set of SS/PBCH blocks in the subset of SSBs (that may be previously indicated or derived), if channel access mode being semi-static is provided and the $N_{gap}$ symbols does not overlap with a set of consecutive symbols before the start of a next channel occupancy time where the UE does not transmit. In some aspects, the candidate SS/PBCH block index of the SS/PBCH block corresponds to the SS/PBCH block index in a set of SS/PBCH blocks in the subset of SSBs (that may be previously indicated or derived) provided by ssb-PositionsInBurst in SIB1 or in ServingCellConfigCommon. In some aspects, for unpaired spectrum, the UE determines the $N_{PUCCH}^{repeat}$ slots for a PUCCH transmission starting from a slot indicated to the UE for HARQ-ACK reporting, or a slot determined SR reporting or for CSI reporting and having 1) an UL symbol, or flexible symbol that is not SS/PBCH block symbol a set of SS/PBCH blocks in the subset of SSBs (that may be indicated or determined based on any of the example aspects presented herein) provided by starting symbol index in PUCCH format 1/3 or a first symbol in PUCCH format 4, or 2) consecutive UL symbols or flexible symbols that are not SS/PBCH block symbols in a set of SS/PBCH blocks in the subset of SSBs (that may be previously indicated or derived), starting from the first symbol, equal to or larger than a number of symbols provided by number of symbols.

In some aspects, if a UE is configured with multiple serving cells and is provided and enabled with directional collision handling for a set of serving cell(s) among the multiple serving cells and indicates support for half duplex operation capability without full duplex and is not configured to monitor PDCCH for detection of DCI format 2_0 on any of the multiple serving cells, for a set of symbols of a slot that are indicated to the UE for reception of SS/PBCH blocks in the subset of SSBs (that may be indicated or determined based on any of the example aspects presented herein) in a first cell of the multiple serving cells by ssb-PositionsInBurst in SIB1 or by ssb-PositionsInBurst in ServingCellConfigCommon, when provided to the UE, the UE does not transmit PUSCH, PUCCH, or PRACH in the slot if a transmission would overlap with any symbol from the set of symbols, and the UE does not transmit SRS in the set of symbols of the slot in any of the multiple serving cells if the UE is not capable of simultaneous transmission and reception among the multiple serving cells and any one of the cells corresponding to the same band as the first cell.

Figure 9:
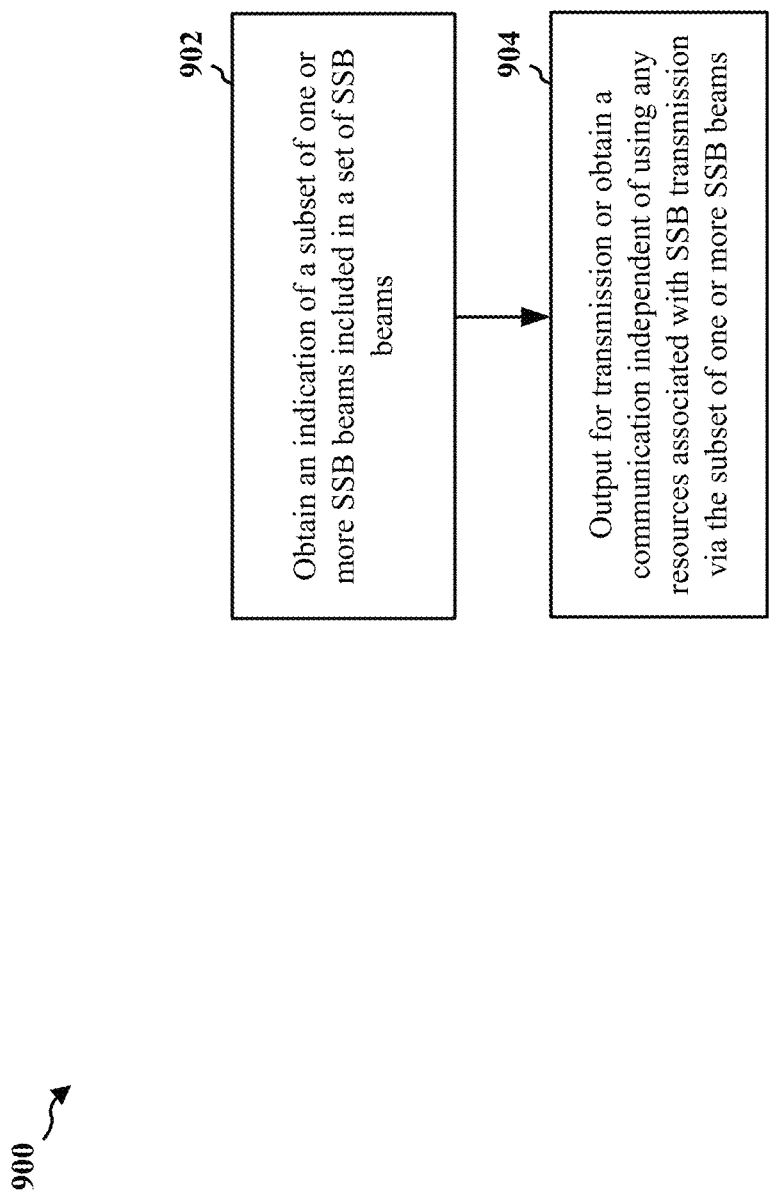
FIG. 9 is a flowchart of a method of wireless communication, in accordance with various aspects of the present disclosure.

FIG. 9 is a flowchart depicting example operations 900 for wireless communication. The operations may be performed by a UE (e.g., the UE 104, 350, 404, 505, 704, 706, 708, 802; the apparatus 1302) or a component at a UE. The operations may enable more efficient use of wireless resources by enabling the use of resources that overlap with resources of one or more SSBs, in some circumstances.

At 902, the UE or the component at the UE may obtain an indication of a subset of one or more SSB beams included in a set of SSB beams. For example, the UE 802 may receive an indication of a subset of one or more SSB beams (e.g., indication of SSB 814) included in a set of SSB beams for resource conflict avoidance from the NTN 804. In some aspects, 902 may be performed by collision avoidance component 1342 in FIG. 13.

At 904, the UE or the component at the UE may output for transmission or obtain a communication independent of using any resources associated with SSB transmission via the subset of one or more SSB beams. For example, the UE 802 may transmit or receive communication (e.g., at 820) independent of using any resources associated with SSB transmission via the subset of one or more SSB beams indicated to the UE. In some aspects, 904 may be performed by collision avoidance component 1342 in FIG. 13.

Figure 10:
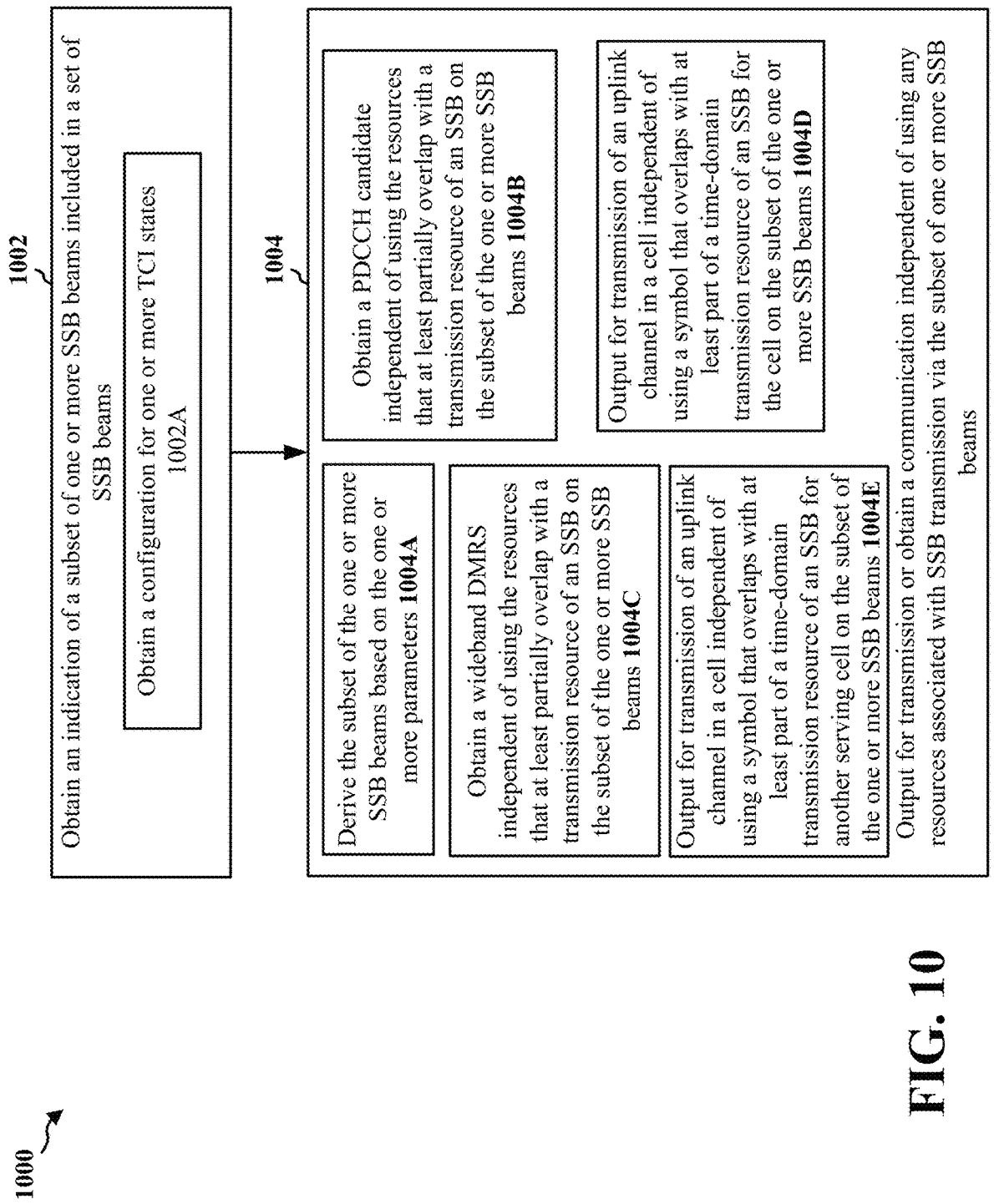
FIG. 10 is a flowchart of a method of wireless communication, in accordance with various aspects of the present disclosure.

FIG. 10 is a flowchart depicting example operations 1000 of a method of wireless communication. The operations may be performed by a UE (e.g., the UE 104, 350, 404, 505, 704, 706, 708, 802; the apparatus 1302) or a component at the UE. The operations may enable more efficient use of wireless resources by enabling the use of resources that overlap with resources of one or more SSBs for the communication between the UE and the network, in some circumstances.

At 1002, the UE or the component at the UE may obtain an indication of a subset of one or more SSB beams included in a set of SSB beams. For example, the UE 802 may receive an indication of a subset of one or more SSB beams (e.g., indication of SSB 814) included in a set of SSB beams for resource conflict avoidance from the NTN 804. In some aspects, 1002 may be performed by collision avoidance component 1342 in FIG. 13. In some aspects, as part of 1002, the UE or the component at the UE may obtain a configuration for one or more TCI states at 1002A. In some aspects, the indication of the subset of the one or more SSB beams may be determined by the UE based on at least one of the one or more TCI states. In some aspects, the indication of the subset of the one or more SSB beams may be obtained via a broadcast. In some aspects, the indication of the subset of the one or more SSB beams may correspond to at least one of a table, a function, or a rule that indexes between or among one or more SSB serving beams and the subset of the one or more SSB beams. In some aspects, the indication of the subset of the one or more SSB beams is obtained via the one or more SSB serving beams. In some aspects, the indication of the subset of the one or more SSB beams may be obtained via at least one of RRC message, a DCI, or a MAC-CE. In some aspects, the indication of the subset of the one or more SSB beams may be obtained via a message for multiple UEs, e.g. by multicasting.

At 1004, the UE may output for transmission or obtain a communication independent of using any resources associated with SSB transmission via the subset of one or more SSB beams. For example, the UE 802 may transmit or receive communication (e.g., at 820) independent of using any resources associated with SSB transmission via the subset of one or more SSB beams indicated to the UE. In some aspects, 1004 may be performed by collision avoidance component 1342 in FIG. 13. In some aspects, as part of 1004, the UE may derive the subset of the one or more SSB beams based on the one or more parameters at 1004A. In some aspects, the indication may include one or more parameters. In some aspects, to derive the subset of the one or more SSB beams may be further based on UE information. The UE information may include one or more of: a location of the UE, a height of the UE, an antenna type of the UE, or a TCI state configured for the UE.

In some aspects, as part of 1004, at 1004B, to obtain the communication independent of using any resources associated with the SSB transmission via the subset of the one or more SSB beams, the UE or the component at the UE may obtain a PDCCH candidate independent of using overlapping resources that at least partially overlap with a transmission resource of an SSB on the subset of the one or more SSB beams.

In some aspects, as part of 1004, at 1004C, to obtain the communication independent of using any resources associated with the SSB transmission via the subset of the one or more SSB beams, the UE or the component at the UE may obtain a wideband DMRS independent of using overlapping resources that at least partially overlap with a transmission resource of an SSB on the subset of the one or more SSB beams.

In some aspects, as part of 1004, at 1004D, to output for independent of using any resources associated with the SSB transmission via the subset of the one or more SSB beams, the UE or the component at the UE may output for transmission of an uplink channel in a cell independent of using a symbol that overlaps with at least part of a time-domain transmission resource of an SSB for the cell on the subset of the one or more SSB beams. In some aspects, the uplink channel may include a PUSCH, a PUCCH, or a PRACH.

In some aspects, as part of 1004, at 1004E, to output for transmission independent of using any resources associated with the SSB transmission via the subset of the one or more SSB beams, the UE or the component at the UE may output for transmission of an uplink channel in a cell in independent of using a symbol that overlaps with at least part of a time-domain transmission resource of an SSB for another serving cell on the subset of the one or more SSB beams. In some aspects, the uplink channel may include a PUSCH, a PUCCH, or a PRACH. In some aspects, the indication may be received from an NTN device.

Figure 11:
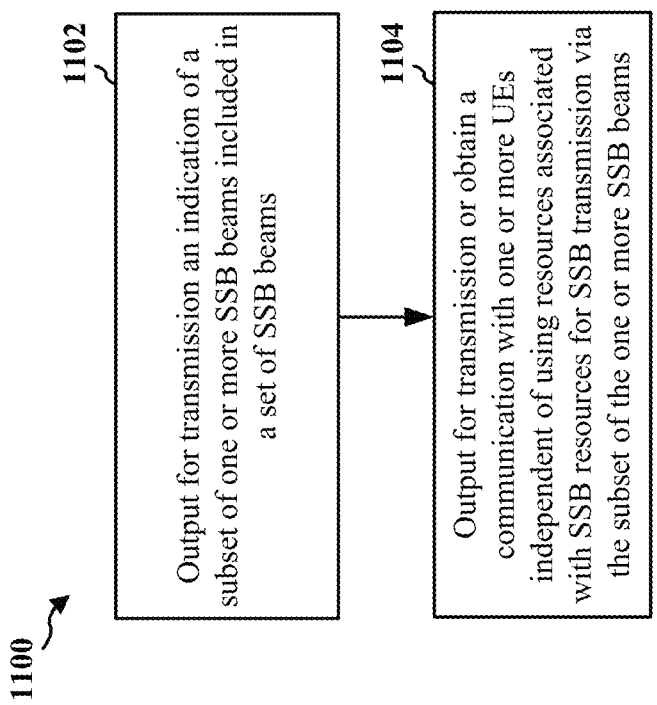
FIG. 11 is a flowchart of a method of wireless communication, in accordance with various aspects of the present disclosure.

FIG. 11 is a flowchart depicting example operations 1100 for wireless communication. The operations may be performed by a network device (e.g., the NTN device 103, 402, 502, 702, 806; NTN 804; the base station 102/180; the network device; the apparatus 1402) or a component at a network device.

At 1102, the network device or a component at a network device may output for transmission an indication of a subset of one or more SSB beams included in a set of SSB beams. For example, the NTN 804 may transmit an indication of a subset of one or more SSB beams (e.g., the indication of SSB 814) included in a set of SSB beams for resource conflict avoidance. In some aspects, 1102 may be performed by collision avoidance component 1442 in FIG. 14.

At 1104, the network device or a component at a network device may output for transmission or obtain a communication with one or more UEs independent of using resources associated with SSB resources for SSB transmission via the subset of the one or more SSB beams. For example, the NTN 804 may transmit or receive communication (e.g., at 820) with one or more UEs independent of using resources associated with SSB resources for SSB transmission via the subset of the one or more SSB beams. In some aspects, 1104 may be performed by collision avoidance component 1442 in FIG. 14.

Figure 12:
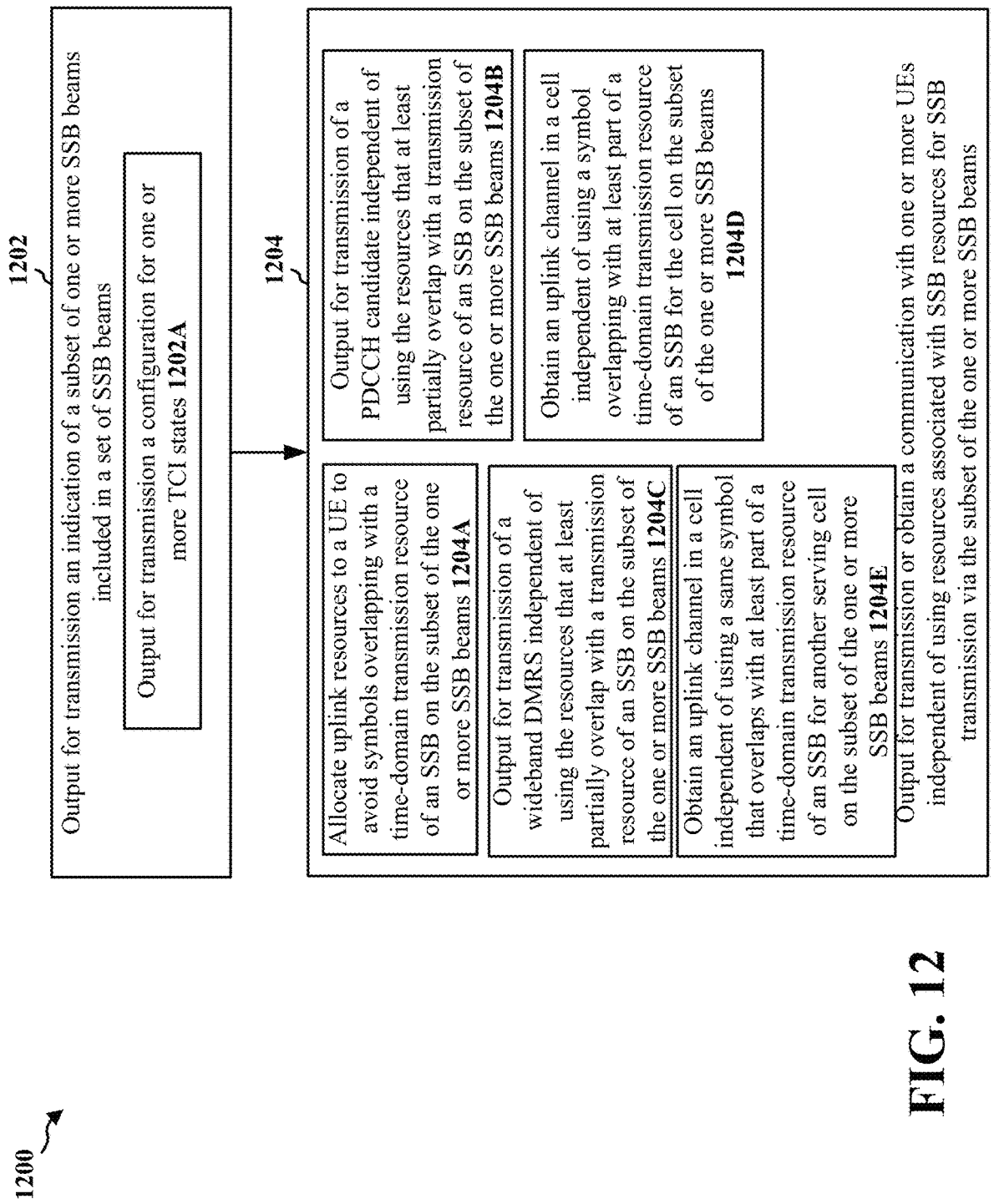
FIG. 12 is a flowchart of a method of wireless communication, in accordance with various aspects of the present disclosure.

FIG. 12 is a flowchart depicting example operations 1200 of a method of wireless communication. The method may be performed by a network device (e.g., the NTN device 103, 402, 502, 702, 806; NTN 804; the network device 310; the base station 102/180; the apparatus 1402) or a component at a network device.

At 1202, the network device or a component at a network device may output for transmission an indication of a subset of one or more SSB beams included in a set of SSB beams. For example, the NTN 804 may transmit an indication of a subset of one or more SSB beams (e.g., the indication of SSB 814) included in a set of SSB beams for resource conflict avoidance. In some aspects, 1202 may be performed by collision avoidance component 1442 in FIG. 14. In some aspects, as part of 1202, the network device or a component at the network device may output for transmission a configuration for one or more TCI states at 1202A. In some aspects, the indication of the subset of the one or more SSB beams may be based on at least one of the one or more TCI states. In some aspects, the indication of the subset of the one or more SSB beams may be obtained via a broadcast. In some aspects, the indication of the subset of the one or more SSB beams may correspond to at least one of a table, a function, or a rule that indexes between or among one or more SSB serving beams and the subset of the one or more SSB beams. In some aspects, to output for transmission the indication, the network device or a component at the network device may output for transmission the indication of the subset of the one or more SSB beams on the one or more SSB serving beams. In some aspects, the indication of the subset of the one or more SSB beams may be obtained via at least one of RRC message, a DCI, or a MAC-CE. In some aspects, the indication of the subset of the one or more SSB beams may be obtained via a message for multiple UEs.

At 1204, the network device or a component at the network device may output for transmission or obtain a communication with one or more UEs independent of using resources associated with SSB resources for SSB transmission via the subset of the one or more SSB beams. For example, the NTN 804 may transmit or receive communication (e.g., at 820) with one or more UEs to avoid resources conflicted with SSB resources for SSB transmission via the subset of the one or more SSB beams. In some aspects, 1204 may be performed by collision avoidance component 1442 in FIG. 14. In some aspects, as part of 1204, at 1204A, the network device or a component at the network device may allocate uplink resources to a UE independent of using symbols overlapping with a time-domain transmission resource of an SSB on the subset of the one or more SSB beams.

In some aspects, to output for transmission independent of using the resources associated with the SSB resources for the SSB transmission via the subset of the one or more SSB beams, at 1204B, the network device or a component at the network device may output for transmission of a PDCCH candidate independent of using overlapping resources that at least partially overlap with a transmission resource of an SSB on the subset of the one or more SSB beams.

In some aspects, to output for transmission independent of using the resources associated with the SSB resources for the SSB transmission via the subset of the one or more SSB beams, at 1204C, the network device or a component at the network device may output for transmission of a wideband DMRS independent of using overlapping resources that at least partially overlap with a transmission resource of an SSB on the subset of the one or more SSB beams.

In some aspects, to obtain independent of the resources associated with the SSB resources for the SSB transmission via the subset of the one or more SSB beams, at 1204D, the network device or a component at the network device may obtain an uplink channel in a cell independent of a symbol overlapping with at least part of a time-domain transmission resource of an SSB for the cell on the subset of the one or more SSB beams. In some aspects, the uplink channel may include a PUSCH, a PUCCH, or a PRACH.

In some aspects, to obtain the communication independent of using the resources conflicted with the SSB resources for the SSB transmission via the subset of the one or more SSB beams, at 1204E, the network device or a component at the network device may obtain an uplink channel in a cell independent of using a symbol that overlaps with at least part of a time-domain transmission resource of an SSB for another serving cell on the subset of the one or more SSB beams. In some aspects, the uplink channel may include a PUSCH, a PUCCH, or a PRACH.

Figure 13:
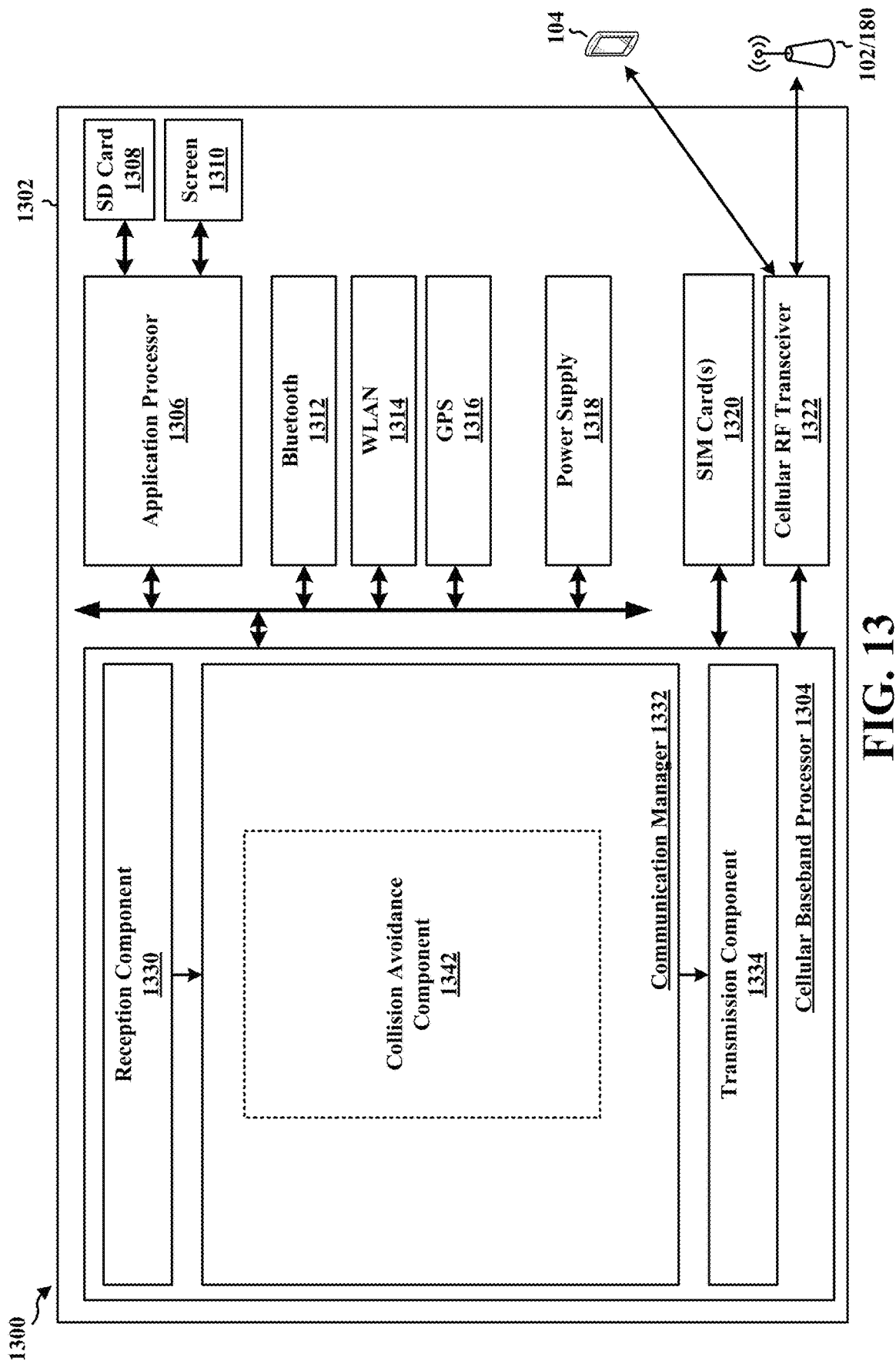
FIG. 13 is a diagram illustrating an example of a hardware implementation for an example apparatus, in accordance with various aspects of the present disclosure.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 may include a collision avoidance component 1342 that may be configured to obtain an indication of a subset of one or more SSB beams included in a set of SSB beams, e.g., as described in connection with 902 in FIGS. 9 and 1002 in FIG. 10. In some aspects, the collision avoidance component 1342 may be further configured to output for transmission or obtain a communication independent of using any resources associated with SSB transmission via the subset of one or more SSB beams, e.g., as described in connection with 904 in FIGS. 9 and 1004 in FIG. 10.

The apparatus may include additional components that perform each of the blocks of the algorithm in the flowcharts of FIGS. 9-10. As such, each block in the flowcharts of FIGS. 9-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, may include means for obtaining an indication of a subset of one or more SSB beams included in a set of SSB beams. The cellular baseband processor 1304 may further include means for outputting for transmission or obtaining a communication independent of using any resources associated with SSB transmission via the subset of one or more SSB beams. The cellular baseband processor 1304 may further include means for obtaining a configuration for one or more TCI states, the indication of the subset of the one or more SSB beams being based on at least one of the one or more TCI states. The cellular baseband processor 1304 may further include means for deriving the subset of the one or more SSBs based on the one or more parameters. The cellular baseband processor 1304 may further include means for obtaining of a PDCCH candidate independent of using overlapping resources that at least partially overlap with a transmission resource of an SSB on the subset of the one or more SSB beams. The cellular baseband processor 1304 may further include means for obtaining of a wideband DMRS independent of using overlapping resources that at least partially overlap with a transmission resource of an SSB on the subset of the one or more SSB beams. The cellular baseband processor 1304 may further include means for outputting for transmission of an uplink channel in a cell independent of using a symbol that overlaps with at least part of the time-domain transmission resource of an SSB for the cell on the subset of the one or more SSB beams. The cellular baseband processor 1304 may further include means for outputting for transmission of an uplink channel in a cell independent of using a symbol that overlaps with at least part of a time-domain transmission resource of an SSB for another serving cell on the subset of the one or more SSB beams. The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
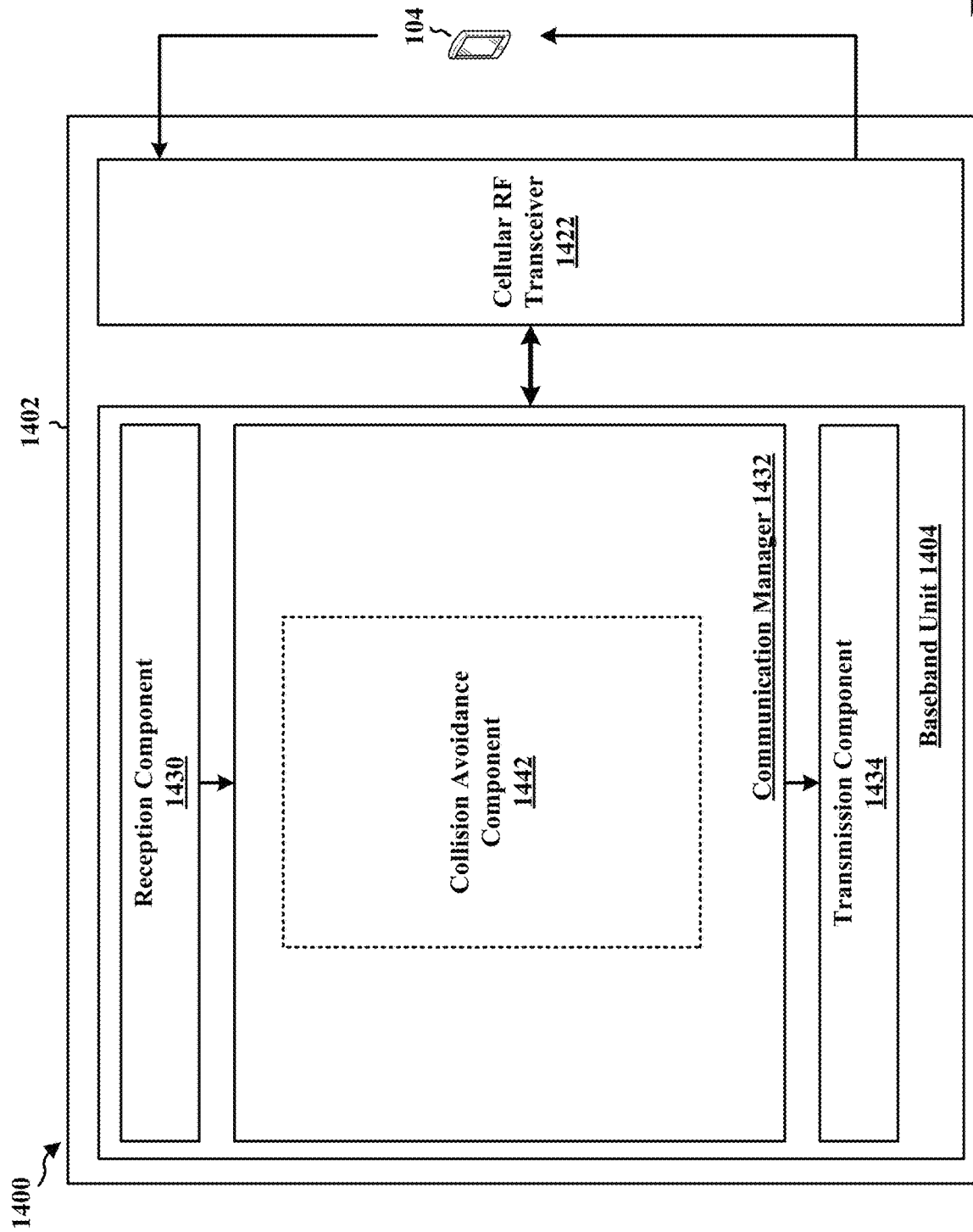
FIG. 14 is a diagram illustrating an example of a hardware implementation for an example apparatus, in accordance with various aspects of the present disclosure.

FIG. 14 is a diagram 1400 illustrating an example of a hardware implementation for an apparatus 1402. The apparatus 1402 may be a base station, a component of a base station, or may implement base station functionality. In some aspects, the apparatus 13021402 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the network device 310 and may include the memory 376 and/or at least one of the TX processor 316, the RX processor 370, and the controller/processor 375.

The communication manager 1432 may include a collision avoidance component 1442 that may output for transmission an indication of a subset of one or more SSB beams included in a set of SSB beams, e.g., as described in connection with 1102 in FIG. 11 or 1202 in FIG. 12. In some aspects, the collision avoidance component 1442 may output for transmission or obtain a communication with one or more UEs to avoid resources conflicted with SSB resources for SSB transmission via the subset of the one or more SSB beams, e.g., as described in connection with 1104 in FIG. 11 or 1204 in FIG. 12.

The apparatus may include additional components that perform each of the blocks of the algorithm in the flowcharts of FIG. 11 or 12. As such, each block in the flowcharts of FIG. 11 or 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, may include means for outputting for transmission an indication of a subset of one or more SSB beams included in a set of SSB beams. The baseband unit 1404 may further include means for outputting for transmission or obtaining a communication with one or more UEs to avoid resources conflicted with SSB resources for SSB transmission via the subset of the one or more SSB beams. The baseband unit 1404 may further include means for outputting for transmission a configuration for one or more TCI states, the indication of the subset of the one or more SSB beams being based on at least one of the one or more TCI states. The baseband unit 1404 may further include means for outputting for transmission of a PDCCH candidate independent of using overlapping resources that at least partially overlap with a transmission resource of an SSB on the subset of the one or more SSB beams. The baseband unit 1404 may further include means for outputting for transmission of a wideband DMRS independent of using overlapping resources that at least partially overlap with the transmission resource of an SSB on the subset of the one or more SSB beams. The baseband unit 1404 may further include means for allocating uplink resources to a UE to avoid symbols overlapping with a time-domain transmission resource of an SSB on the subset of the one or more SSB beams. The baseband unit 1404 may further include means for obtaining an uplink channel in a cell independent of using a symbol overlapping with at least part of a time-domain transmission resource of an SSB for the cell on the subset of the one or more SSB beams. The baseband unit 1404 may further include means for obtaining an uplink channel in a cell independent of using a symbol that overlaps with at least part of a time-domain transmission resource of an SSB for another serving cell on the subset of the one or more SSB beams. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1: A method for wireless communication, comprising: obtaining an indication of a subset of one or more synchronization signal block (SSB) beams included in a set of SSB beams; and outputting for transmission or obtaining a communication independent of using any resources associated with SSB transmission via the subset of one or more SSB beams.

Aspect 2: The method of aspect 1, further comprising: obtaining a configuration for one or more transmission configuration indication (TCI) states, the indication of the subset of the one or more SSB beams being based on the one or more TCI states.

Aspect 3: The method of any of aspects 1-2, wherein the indication of the subset of the one or more SSB beams is obtained via a broadcast.

Aspect 4: The method of any of aspects 1-3, wherein the indication of the subset of the one or more SSB beams corresponds to at least one of a table, a function, or a rule that indexes between or among one or more SSB serving beams and the subset of the one or more SSB beams.

Aspect 5: The method of aspect 4, wherein the indication of the subset of the one or more SSB beams is obtained via the one or more SSB serving beams.

Aspect 6: The method of any of aspects 1-5, wherein the indication of the subset of the one or more SSB beams is obtained via at least one of a radio resource control (RRC) message, a downlink control information (DCI), or a medium access control-control element (MAC-CE).

Aspect 7: The method of any of aspects 1-6, wherein the indication of the subset of the one or more SSB beams is obtained via a message intended for multiple devices.

Aspect 8: The method of any of aspects 1-7, wherein the indication includes one or more parameters, and further comprising: deriving the subset of the one or more SSB beams based on the one or more parameters.

Aspect 9: The method of aspect 8, wherein the derivation of the subset of the one or more SSB beams is further based on user equipment (UE) information that includes at least one of: a location of the apparatus, a height of the apparatus, an antenna type of the apparatus, or a transmission configuration indication (TCI) state configured for the apparatus.

Aspect 10: The method of any of aspects 1-9, wherein outputting for transmission or obtain the communication independent of using any resources associated with the SSB transmission via the subset of the one or more SSB beams further comprises: obtain a physical downlink control channel (PDCCH) candidate independent of using overlapping resources that at least partially overlap with a transmission resource of an SSB on the subset of the one or more SSB beams.

Aspect 11: The method of any of aspects 1-10, wherein obtaining the communication independent of using any resources associated with the SSB transmission via the subset of the one or more SSB beams comprises: obtaining a wideband demodulation reference signal (DMRS) independent of using overlapping resources that at least partially overlap with a transmission resource of an SSB on the subset of the one or more SSB beams.

Aspect 12: The method of any of aspects 1-11, wherein outputting for transmission independent of using any resources associated with the SSB transmission via the subset of the one or more SSB beams comprises: outputting for transmission of an uplink channel in a cell independent of using a symbol that overlaps with at least part of a time-domain transmission resource of an SSB for the cell on the subset of the one or more SSB beams, wherein the uplink channel includes a physical uplink shared channel (PUSCH), a physical uplink control channel (PUCCH), or a physical random access channel (PRACH).

Aspect 13: The method of any of aspects 1-12, wherein outputting for transmission independent of using any resources associated with the SSB transmission via the subset of the one or more SSB beams comprises: outputting for transmission of an uplink channel in a cell independent of using a symbol that overlaps with at least part of a time-domain transmission resource of an SSB for another serving cell on the subset of the one or more SSB beams, wherein the uplink channel includes a physical uplink shared channel (PUSCH), a physical uplink control channel (PUCCH), or a physical random access channel (PRACH).

Aspect 14: A method for wireless communication, comprising: outputting for transmission an indication of a subset of one or more synchronization signal block (SSB) beams included in a set of SSB beams; and outputting for transmission or obtain a communication with one or more UEs to avoid resources conflicted with SSB resources for SSB transmission via the subset of the one or more SSB beams.

Aspect 15: The method of aspect 14, further comprising: outputting for transmission a configuration for one or more transmission configuration indication (TCI) states, the indication of the subset of the one or more SSB beams being based on the one or more TCI states.

Aspect 16: The method of any of aspects 14-15, wherein the indication of the subset of the one or more SSB beams is obtained via a broadcast.

Aspect 17: The method of any of aspects 14-16, wherein the indication of the subset of the one or more SSB beams corresponds to at least one of a table, a function, or a rule that indexes between or among one or more SSB serving beams and the subset of the one or more SSB beams, wherein the indication is outputted for transmission via the one or more SSB serving beams.

Aspect 18: The method of any of aspects 14-17, wherein the indication of the subset of the one or more SSB beams is outputted for transmission via at least one of a radio resource control (RRC) message, a downlink control information (DCI), or a medium access control-control element (MAC-CE).

Aspect 19: The method of any of aspects 14-18, wherein the indication of the subset of the one or more SSB beams is outputted via a message for multiple UEs.

Aspect 20: The method of any of aspects 14-19, wherein outputting for transmission independent of using the resources associated with the SSB resources for the SSB transmission via the subset of the one or more SSB beams further comprises: outputting for transmission of a physical downlink control channel (PDCCH) candidate independent of using overlapping resources that at least partially overlap with a transmission resource of an SSB on the subset of the one or more SSB beams.

Aspect 21: The method of any of aspects 14-20, wherein outputting for transmission independent of using the resources associated with the SSB resources for the SSB transmission via the subset of the one or more SSB beams further comprises: outputting for transmission of a wideband demodulation reference signal (DMRS) independent of using overlapping resources that at least partially overlap with a transmission resource of an SSB on the subset of the one or more SSB beams.

Aspect 22: The method of any of aspects 14-21, further comprising: allocating uplink resources to a user equipment (UE) independent of using symbols overlapping with a time-domain transmission resource of an SSB on the subset of the one or more SSB beams.

Aspect 23: The method of any of aspects 14-22, wherein obtaining the communication independent of using the resources associated with the SSB resources for the SSB transmission via the subset of the one or more SSB beams further comprises: obtaining an uplink channel in a cell independent of using a symbol overlapping with at least part of a time-domain transmission resource of an SSB for the cell on the subset of the one or more SSB beams, wherein the uplink channel includes a physical uplink shared channel (PUSCH), a physical uplink control channel (PUCCH), or a physical random access channel (PRACH).

Aspect 24: The method of any of aspects 14-23, wherein obtaining the communication independent of using the resources associated with the SSB resources for the SSB transmission from the subset of the one or more SSB beams further comprises: obtaining an uplink channel in a cell independent of using a symbol that overlaps with at least part of a time-domain transmission resource of an SSB for another serving cell on the subset of the one or more SSB beams, wherein the uplink channel includes a physical uplink shared channel (PUSCH), a physical uplink control channel (PUCCH), or a physical random access channel (PRACH).

Aspect 25: An apparatus for wireless communications, comprising: a memory comprising instructions; and one or more processors configured to execute the instructions and cause the apparatus to perform a method in accordance with any one of Aspects 1-12.

Aspect 26: An apparatus for wireless communications, comprising: a memory comprising instructions; and one or more processors configured to execute the instructions and cause the apparatus to perform a method in accordance with any one of Aspects 13-24.

Aspect 27: A user equipment (UE), comprising: at least one transceiver; a memory comprising instructions; and one or more processors configured to execute the instructions and cause the UE to perform a method in accordance with any one of Aspects 1-12, wherein the at least one transceiver is configured to transmit or receive the communication.

Aspect 28: A network device, comprising: at least one transceiver; a memory comprising instructions; and one or more processors configured to execute the instructions and cause the network device to perform a method in accordance with any one of Aspects 13-24, wherein the at least one transceiver is configured to transmit or receive the communication.

Aspect 29: An apparatus for wireless communications, comprising means for performing a method in accordance with any one of Aspects 1-12.

Aspect 30: An apparatus for wireless communications, comprising means for performing a method in accordance with any one of Aspects 13-24.

Aspect 31: A non-transitory computer-readable medium comprising instructions that, when executed by an apparatus, cause the apparatus to perform a method in accordance with any one of Aspects 1-12.

Aspect 32: A non-transitory computer-readable medium comprising instructions that, when executed by an apparatus, cause the apparatus to perform a method in accordance with any one of Aspects 13-24.

What is claimed is:

1. An apparatus for wireless communication, comprising:
a memory comprising instructions; and
one or more processors configured to execute the instructions and cause the apparatus to:
obtain an indication of a subset of one or more synchronization signal block (SSB) beams included in a set of SSB beams; and
output for transmission or obtain a communication independent of using any resources associated with SSB transmission via the subset of one or more SSB beams, wherein to output for transmission or to obtain the communication the apparatus is configured to at least one of:
obtain a physical downlink control channel (PDCCH) candidate independent of using overlapping resources that at least partially overlap with a transmission resource of an SSB on the subset of the one or more SSB beams;
obtain a wideband demodulation reference signal (DMRS) independent of using overlapping resources that at least partially overlap with a transmission resource of an SSB on the subset of the one or more SSB beams;
output for transmission of an uplink channel in a cell independent of using a symbol that overlaps with at least part of a time-domain transmission resource of an SSB for the cell on the subset of the one or more SSB beams, wherein the uplink channel includes a physical uplink shared channel (PUSCH), a physical uplink control channel (PUCCH), or a physical random access channel (PRACH); or
output for transmission of an uplink channel in a cell independent of using a symbol that overlaps with at least part of a time-domain transmission resource of an SSB for another serving cell on the subset of the one or more SSB beams, wherein the uplink channel includes a PUSCH, a PUCCH or a PRACH.

2. The apparatus of claim 1, wherein the one or more processors are further configured to cause the apparatus to:
obtain a configuration for one or more transmission configuration indication (TCI) states, the indication of the subset of the one or more SSB beams being based on the one or more TCI states.

3. The apparatus of claim 1, wherein the indication of the subset of the one or more SSB beams is obtained via a broadcast.

4. The apparatus of claim 1, wherein the indication of the subset of the one or more SSB beams corresponds to at least one of a table, a function, or a rule that indexes between or among one or more SSB serving beams and the subset of the one or more SSB beams.

5. The apparatus of claim 4, wherein the indication of the subset of the one or more SSB beams is obtained via the one or more SSB serving beams.

6. The apparatus of claim 1, wherein the indication of the subset of the one or more SSB beams is obtained via at least one of a radio resource control (RRC) message, a downlink control information (DCI), or a medium access control-control element (MAC-CE).

7. The apparatus of claim 1, wherein the indication of the subset of the one or more SSB beams is obtained via a message intended for multiple devices.

8. The apparatus of claim 1, wherein the indication includes one or more parameters, the one or more processors are further configured to cause the apparatus to:
  derive the subset of the one or more SSB beams based on the one or more parameters.

9. The apparatus of claim 8, wherein the derivation of the subset of the one or more SSB beams is further based on user equipment (UE) information that includes at least one of:
  a location of the apparatus,
  a height of the apparatus,
  an antenna type of the apparatus, or
  a transmission configuration indication (TCI) state configured for the apparatus.

10. The apparatus of claim 1, wherein the one or more processors are configured to cause the apparatus to:
  obtain the PDDCH candidate independent of using the overlapping resources that at least partially overlap with the transmission resource of the SSB on the subset of the one or more SSB beams.

11. The apparatus of claim 1, wherein the one or more processors are configured to cause the apparatus to:
  obtain the DMRS independent of using the overlapping resources that at least partially overlap with the transmission resource of the SSB on the subset of the one or more SSB beams.

12. The apparatus of claim 1, wherein the one or more processors are configured to cause the apparatus to:
  output for transmission of the uplink channel in the cell independent of using the symbol that overlaps with at least part of the time-domain transmission resource of the SSB for the cell on the subset of the one or more SSB beams, wherein the uplink channel includes the PUSCH, the PUCCH or the PRACH.

13. The apparatus of claim 1, wherein the one or more processors are configured to cause the apparatus to:
  output for transmission of an uplink channel in the cell independent of using the symbol that overlaps with at least part of the time-domain transmission resource of the SSB for other serving cell on the subset of the one or more SSB beams, wherein the uplink channel includes the PUSCH, the PUCCH or the PRACH.

14. The apparatus of claim 1, further comprising:
  at least one transceiver configured to transmit or receive the communication, wherein the apparatus is configured as a user equipment.

15. An apparatus for wireless communication, comprising:
  a memory comprising instructions; and
  one or more processors configured to execute the instructions and cause the apparatus to:
    output for transmission an indication of a subset of one or more synchronization signal block (SSB) beams included in a set of SSB beams; and
    output for transmission or obtain a communication with one or more user equipments (UEs) independent of using resources associated with SSB resources for SSB transmission via the subset of the one or more SSB beams, wherein to output for transmission or to obtain the communication the apparatus is configured to at least one of:
      output for transmission of a physical downlink control channel (PDCCH) candidate independent of using overlapping resources that at least partially overlap with a transmission resource of an SSB on the subset of the one or more SSB beams;
      output for transmission of a wideband demodulation reference signal (DMRS) independent of using overlapping resources that at least partially overlap with a transmission resource of an SSB on the subset of the one or more SSB beams;
      obtain an uplink channel in a cell independent of using a symbol overlapping with at least part of a time-domain transmission resource of an SSB for the cell on the subset of the one or more SSB beams, wherein the uplink channel includes a physical uplink shared channel (PUSCH), a physical uplink control channel (PUCCH), or a physical random access channel (PRACH); or
      obtain an uplink channel in a cell independent of using a symbol that overlaps with at least part of a time-domain transmission resource of an SSB for another serving cell on the subset of the one or more SSB beams, wherein the uplink channel includes a PUSCH, a PUCCH or a PRACH.

16. The apparatus of claim 15, wherein the one or more processors are further configured to cause the apparatus to:
  output for transmission a configuration for one or more transmission configuration indication (TCI) states, the indication of the subset of the one or more SSB beams being based on the one or more TCI states.

17. The apparatus of claim 15, wherein the indication of the subset of the one or more SSB beams is obtained via a broadcast.

18. The apparatus of claim 15, wherein the indication of the subset of the one or more SSB beams corresponds to at least one of a table, a function, or a rule that indexes between or among one or more SSB serving beams and the subset of the one or more SSB beams, wherein the indication is outputted for transmission via the one or more SSB serving beams.

19. The apparatus of claim 15, wherein the indication of the subset of the one or more SSB beams is outputted for transmission via at least one of a radio resource control (RRC) message, a downlink control information (DCI), or a medium access control-control element (MAC-CE).

20. The apparatus of claim 15, wherein the indication of the subset of the one or more SSB beams is outputted via a message for multiple UEs.

21. The apparatus of claim 15, wherein the one or more processors are configured to cause the apparatus to:
  output for transmission of the PDCCH candidate independent of using the overlapping resources that at least partially overlap with the transmission resource of the SSB on the subset of the one or more SSB beams.

22. The apparatus of claim 15, wherein the one or more processors are configured to cause the apparatus to:
  output for transmission of the DMRS independent of using the overlapping resources that at least partially overlap with the transmission resource of the SSB on the subset of the one or more SSB beams.

23. The apparatus of claim 15, wherein the one or more processors are further configured to cause the apparatus to:
  allocate uplink resources to a user equipment (UE) independent of symbols overlapping with a time-domain transmission resource of an SSB on the subset of the one or more SSB beams.

24. The apparatus of claim 15, wherein the one or more processors are configured to cause the apparatus to:
  obtain an uplink channel in the cell independent of using the symbol overlapping with at least part of the time-domain transmission resource of the SSB for the cell on the subset of the one or more SSB beams, wherein the uplink channel includes the PUSCH, the PUCCH or the PRACH.

25. The apparatus of claim 15, wherein the one or more processors are configured to cause the apparatus to:
  obtain an uplink channel in the cell independent of using the symbol that overlaps with at least part of the time-domain transmission resource of the SSB for the other serving cell on the subset of the one or more SSB beams, wherein the uplink channel includes the PUSCH, the PUCCH or the PRACH.

26. The apparatus of claim 15, further comprising:
  at least one transceiver configured to transmit the indication and to transmit or receive the communication, wherein the apparatus is configured as a network device.

27. A method for wireless communication at an user equipment (UE), comprising:
  obtaining an indication of a subset of one or more synchronization signal block (SSB) beams included in a set of SSB beams; and
  outputting for transmission or obtain a communication independent of using any resources associated with SSB transmission via the subset of one or more SSB beams, wherein outputting for transmission or obtaining the communication comprises at least one of:
  obtaining a physical downlink control channel (PDCCH) candidate independent of using overlapping resources that at least partially overlap with a transmission resource of an SSB on the subset of the one or more SSB beams;
  obtaining a wideband demodulation reference signal (DMRS) independent of using overlapping resources that at least partially overlap with a transmission resource of an SSB on the subset of the one or more SSB beams;
  outputting for transmission of an uplink channel in a cell independent of using a symbol that overlaps with at least part of a time-domain transmission resource of an SSB for the cell on the subset of the one or more SSB beams, wherein the uplink channel includes a physical uplink shared channel (PUSCH), a physical uplink control channel (PUCCH), or a physical random access channel (PRACH); or
  outputting for transmission of an uplink channel in a cell independent of using a symbol that overlaps with at least part of a time-domain transmission resource of an SSB for another serving cell on the subset of the one or more SSB beams, wherein the uplink channel includes a PUSCH, a PUCCH or a PRACH.

\* \* \* \* \*